United States Patent
Li et al.

(10) Patent No.: US 11,445,189 B2
(45) Date of Patent: Sep. 13, 2022

(54) IMAGE ENCODING/DECODING METHOD AND DEVICE, AND METHOD FOR TRANSMITTING BITSTREAM

(71) Applicant: LG ELECTRONICS INC., Seoul (KR)

(72) Inventors: Ling Li, Seoul (KR); Jin Heo, Seoul (KR); Moonmo Koo, Seoul (KR); Jung Hak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/472,137

(22) Filed: Sep. 10, 2021

(65) Prior Publication Data

US 2022/0078420 A1 Mar. 10, 2022

Related U.S. Application Data

(63) Continuation of application No. PCT/KR2020/003359, filed on Mar. 11, 2020.

(Continued)

(51) Int. Cl.
*H04N 19/119* (2014.01)
*H04N 19/159* (2014.01)
(Continued)

(52) U.S. Cl.
CPC ......... *H04N 19/119* (2014.11); *H04N 19/159* (2014.11); *H04N 19/176* (2014.11); *H04N 19/186* (2014.11); *H04N 19/593* (2014.11)

(58) Field of Classification Search
CPC ............... H04N 19/119; H04N 19/159; H04N 19/176; H04N 19/186; H04N 19/593
See application file for complete search history.

(56) References Cited

U.S. PATENT DOCUMENTS

| | | | |
|---|---|---|---|
| 9,491,457 B2 | 11/2016 | Wang | |
| 2015/0296220 A1* | 10/2015 | Kim | H04N 19/11 375/240.12 |

(Continued)

FOREIGN PATENT DOCUMENTS

| KR | 20180075422 A | 7/2018 |
|---|---|---|
| KR | 1020180104581 A | 9/2018 |
| RU | 2603552 C2 | 11/2016 |

OTHER PUBLICATIONS

M. Albrecht, et al., "Description of SDR, HDR, and 360° video coding technology proposal by Fraunhofer HHI", Joint Video Experts Team (JVET) of ITU-T SG 16 WP 3 and ISO/IEC JTC 1/SC 29/WG 11, 10th Meeting: San Diego, US, Apr. 10-20, 2018. JVET-J0014-v4.

(Continued)

*Primary Examiner* — Nam D Pham
(74) *Attorney, Agent, or Firm* — Dentons US LLP

(57) ABSTRACT

An image encoding/decoding method and apparatus are provided. An image decoding method according to the present disclosure may include determining whether a prediction mode of a current block is an intra prediction mode based on information on the prediction mode of the current block, determining whether intra sub-partitions (ISP) is available for the current block, when the prediction mode of the current block is an intra prediction mode, decoding an ISP application indicator indicating whether to apply ISP to the current block, when ISP is available for the current block, and generating a prediction block for the current block by applying ISP to the current block, upon determining that ISP applies to the current block based on the ISP application indicator.

15 Claims, 19 Drawing Sheets

Related U.S. Application Data

(60) Provisional application No. 62/817,580, filed on Mar. 13, 2019.

(51) Int. Cl.
   *H04N 19/176* (2014.01)
   *H04N 19/186* (2014.01)
   *H04N 19/593* (2014.01)

(56) References Cited

U.S. PATENT DOCUMENTS

| | | |
|---|---|---|
| 2017/0272748 A1 | 9/2017 | Seregin et al. |
| 2020/0244956 A1* | 7/2020 | Lee .................... H04N 19/17 |

OTHER PUBLICATIONS

Santiago De Luxán Hernández, et al., CE3: Line-based intra coding mode (Tests 1.4.1, 1.4.2 and 1.4.3), Joint Video Experts Team (JVET) of ITU-T SG 16 WP 3 and ISO/IEC JTC 1/SC 29/WG 11, 11th Meeting: Ljubljana, SI, Jul. 10-18, 2018. JVET-K0049-v2.

Santiago De Luxán Hernández, et al., "CE3: Line-based intra coding mode (Tests 2.1.1 and 2.1.2)", Joint Video Experts Team (JVET) of ITU-T SG 16 WP 3 and ISO/IEC JTC 1/SC 29/WG 11, 12th Meeting: Macao, CN, Oct. 3-12, 2018. JVET-L0076-v2.

\* cited by examiner

FIG. 11a

```
X  X  X  X  X  X
O     O     O           X = Location of luma sample
X  X  X  X  X  X   ···  O = Location of chroma sample

```
⊠  X  ⊠  X  ⊠  X
                        X = Location of luma sample
⊠  X  ⊠  X  ⊠  X   ···  O = Location of chroma sample

⊠  X  ⊠  X  ⊠  X

⊠  X  ⊠  X  ⊠  X

⊠  X  ⊠  X  ⊠  X

⊠  X  ⊠  X  ⊠  X
⋮                    ⋱
```

FIG. 16
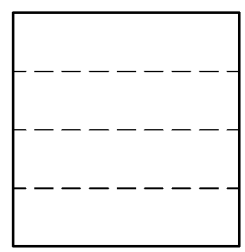
Luma
16x16
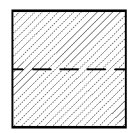
chroma
8x8
in 4:2:0
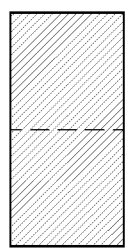
chroma
8x16
in 4:2:2
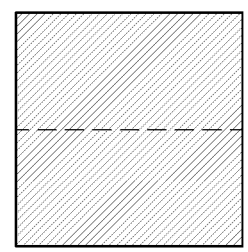
chroma
16x16
in 4:4:4
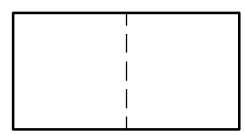
Luma
4x8
chroma
2x4
in 4:2:0
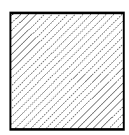
chroma
4x4
in 4:2:2
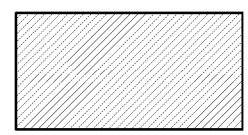
chroma
4x8
in 4:4:4

FIG. 17

| |
|---|
| coding_unit( x0, y0, cbWidth, cbHeight, treeType ) { |
|   if( tile_group_type != I \|\| sps_ibc_enabled_flag ) { |
|     if( treeType != DUAL_TREE_CHROMA ) |
|       cu_skip_flag[ x0 ][ y0 ] |
|     if( cu_skip_flag[ x0 ][ y0 ] = = 0 && tile_group_type != I ) |
|       pred_mode_flag |
|     if( ( ( tile_group_type = = I && cu_skip_flag[ x0 ][ y0 ] = =0 ) \|\|<br>      ( tile_group_type != I && CuPredMode[ x0 ][ y0 ] != MODE_INTRA ) ) &&<br>      sps_ibc_enabled_flag ) |
|       pred_mode_ibc_flag |
|   } |
|   if( CuPredMode[ x0 ][ y0 ] = = MODE_INTRA ) { |
|     if( sps_pcm_enabled_flag &&<br>      cbWidth >= MinIpcmCbSizeY && cbWidth <= MaxIpcmCbSizeY &&<br>      cbHeight >= MinIpcmCbSizeY && cbHeight <= MaxIpcmCbSizeY ) |
|       pcm_flag[ x0 ][ y0 ] |
|     if( pcm_flag[ x0 ][ y0 ] ) { |
|       while( !byte_aligned( ) ) |
|         pcm_alignment_zero_bit |
|       pcm_sample( cbWidth, cbHeight, treeType) |
|     } else { |
|       if( treeType = = SINGLE_TREE \|\| treeType = = DUAL_TREE_LUMA ) { |
|         if( ( y0 % CtbSizeY ) > 0 ) |
|           intra_luma_ref_idx[ x0 ][ y0 ] |
|         if (intra_luma_ref_idx[ x0 ][ y0 ] = = 0 &&<br>          (cbWidth <= MaxTbSizeY && cbHeight <= MaxTbSizeY ) &&<br>          ( cbWidth * cbHeight > MinTbSizeY * MinTbSizeY ))<br>          intra_subpartitions_mode_flag[ x0 ][ y0 ]<br>        if( intra_subpartitions_mode_flag[ x0 ][ y0 ] = = 1 &&<br>          cbWidth <= MaxTbSizeY && cbHeight <= MaxTbSizeY )<br>          intra_subpartitions_split_flag[ x0 ][ y0 ] |
|         if( intra_luma_ref_idx[ x0 ][ y0 ] = = 0 &&<br>          intra_subpartitions_mode_flag[ x0 ][ y0 ] = = 0 ) |
|           intra_luma_mpm_flag[ x0 ][ y0 ] |
|         if( intra_luma_mpm_flag[ x0 ][ y0 ] ) |
|           intra_luma_mpm_idx[ x0 ][ y0 ] |
|         else |
|           intra_luma_mpm_remainder[ x0 ][ y0 ] |
|       } |
|       if (chromaArrayType != 0) { |
|         if( treeType = = SINGLE_TREE \|\| treeType = = DUAL_TREE_CHROMA ) |
|           intra_chroma_pred_mode[ x0 ][ y0 ] |
|       } |
|     } |
|     ... |
|   } |

FIG. 18

| |
|---|
| coding_unit( x0, y0, cbWidth, cbHeight, treeType ) { |
|   if( tile_group_type != I  \|\|   sps_ibc_enabled_flag ) { |
|     if( treeType != DUAL_TREE_CHROMA ) |
|       cu_skip_flag[ x0 ][ y0 ] |
|     if( cu_skip_flag[ x0 ][ y0 ] == 0  &&  tile_group_type != I ) |
|       pred_mode_flag |
|     if( ( ( tile_group_type == I  &&  cu_skip_flag[ x0 ][ y0 ] ==0 )  \|\| <br>      ( tile_group_type != I  &&  CuPredMode[ x0 ][ y0 ] != MODE_INTRA ) ) && <br>      sps_ibc_enabled_flag ) |
|       pred_mode_ibc_flag |
|   } |
|   if( CuPredMode[ x0 ][ y0 ]  ==  MODE_INTRA ) { |
|     if( sps_pcm_enabled_flag  && <br>      cbWidth >= MinIpcmCbSizeY  &&  cbWidth <= MaxIpcmCbSizeY && <br>      cbHeight >= MinIpcmCbSizeY  &&  cbHeight <= MaxIpcmCbSizeY ) |
|       pcm_flag[ x0 ][ y0 ] |
|     if( pcm_flag[ x0 ][ y0 ] ) { |
|       while( !byte_aligned( ) ) |
|         pcm_alignment_zero_bit |
|       pcm_sample( cbWidth, cbHeight, treeType) |
|     } else { |
|       if( treeType == SINGLE_TREE  \|\|  treeType == DUAL_TREE_LUMA ) { |
|         if( ( y0 % CtbSizeY ) > 0 ) |
|           intra_luma_ref_idx[ x0 ][ y0 ] |
|         if (intra_luma_ref_idx[ x0 ][ y0 ] == 0  && <br>          (cbWidth <= MaxTbSizeY && cbHeight <= MaxTbSizeY )  && <br>          ( cbWidth * cbHeight > MinTbSizeY * MinTbSizeY )) |
|           intra_subpartitions_mode_flag[ x0 ][ y0 ] |
|         if( intra_subpartitions_mode_flag[ x0 ][ y0 ] == 1) |
|           intra_subpartitions_split_flag[ x0 ][ y0 ] |
|         if( intra_luma_ref_idx[ x0 ][ y0 ] == 0  && <br>          intra_subpartitions_mode_flag[ x0 ][ y0 ] == 0 ) |
|           intra_luma_mpm_flag[ x0 ][ y0 ] |
|         if( intra_luma_mpm_flag[ x0 ][ y0 ] ) |
|           intra_luma_mpm_idx[ x0 ][ y0 ] |
|         else |
|           intra_luma_mpm_remainder[ x0 ][ y0 ] |
|       } |
|       if (chromaArrayType != 0) { |
|         if( treeType == SINGLE_TREE  \|\|  treeType == DUAL_TREE_CHROMA ) |
|           intra_chroma_pred_mode[ x0 ][ y0 ] |
|       } |
|     } |
|     ... |
|   } |

IMAGE ENCODING/DECODING METHOD AND DEVICE, AND METHOD FOR TRANSMITTING BITSTREAM

This application is a Bypass National Stage filing under 35 U.S.C. 371 of International Application No. PCT/KR2020/003359, filed on Mar. 11, 2020, which claims the benefit of U.S. Patent Application No. 62/817,580 filed on Mar. 13, 2019, the contents of which are all hereby incorporated by reference herein in their entirety.

TECHNICAL FIELD

The present disclosure relates to an image encoding/decoding method and apparatus, and a method of transmitting a bitstream, and, more particularly, to a method and apparatus for encoding/decoding an image by applying intra subblock-partitions (ISP) to images having various chroma formats, and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

An object of the present disclosure is to provide a method and apparatus for encoding/decoding an image by applying ISP to images having various chroma formats.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

An image decoding method performed by an image decoding apparatus according to an aspect of the present disclosure may include determining whether a prediction mode of a current block is an intra prediction mode based on information on the prediction mode of the current block, determining whether intra sub-partitions (ISP) is available for the current block, when the prediction mode of the current block is an intra prediction mode, decoding an ISP application indicator indicating whether to apply ISP to the current block, when ISP is available for the current block, and generating a prediction block for the current block by applying ISP to the current block, upon determining that ISP applies to the current block based on the ISP application indicator.

In the image decoding method of the present disclosure, the determining whether ISP is available for the current block may be performed based on comparison between a size of a luma component block of the current block and a predetermined threshold.

In the image decoding method of the present disclosure, the predetermined threshold may be a maximum transform size.

In the image decoding method of the present disclosure, when both a width and height of the luma component block of the current block are equal to or less than a predetermined threshold, it may be determined that ISP is available for the current block.

In the image decoding method of the present disclosure, the generating the prediction block for the current block by applying ISP to the current block may include generating a prediction block for a luma component block by applying ISP to the luma component block of the current block, determining whether to apply ISP to a chroma component block of the current block, and generating the prediction block for the chroma component block by applying ISP to the chroma component block, upon determining that ISP applies to the chroma component block of the current block.

In the image decoding method of the present disclosure, the determining whether to apply ISP to the chroma component block of the current block may be performed based on at least one of a size of the chroma component block or a chroma format of the current block.

In the image decoding method of the present disclosure, when the chroma format of the current block is 4:2:2 or 4:4:4 and at least one of a width or height of the chroma component block is greater than a maximum transform size, it may be determined that ISP applies to the chroma component block of the current block.

In the image decoding method of the present disclosure, when ISP applies to the chroma component block, a split direction and the number of sub-partitions for the chroma component block may be determined based on a split direction and the number of sub-partitions for the luma component block.

In the image decoding method of the present disclosure, the split direction and the number of sub-partitions for the chroma component block may be equal to the split direction and the number of sub-partitions for the luma component block, respectively.

In the image decoding method of the present disclosure, the generating the prediction block for the current block by applying ISP to the current block may include generating a prediction block for a luma component block by applying ISP to the luma component block of the current block and generating a prediction block for a chroma component block by applying ISP to the chroma component block of the current block.

In the image decoding method of the present disclosure, the split direction and the number of sub-partitions for the chroma component block may be determined based on the split direction and the number of sub-partitions for the luma component block.

In the image decoding method of the present disclosure, the split direction and the number of sub-partitions for the chroma component block may be equal to the split direction and (the number of sub-partitions/2) of the luma component block, respectively.

An image decoding apparatus according to another aspect of the present disclosure may include a memory and at least one processor. At least one processor may determine whether a prediction mode of a current block is an intra prediction mode based on information on the prediction mode of the current block, determine whether intra sub-partitions (ISP) is available for the current block, when the prediction mode of the current block is an intra prediction mode, decode an ISP application indicator indicating whether to apply ISP to the current block, when ISP is available for the current block, and generate a prediction block for the current block by applying ISP to the current block, upon determining that ISP applies to the current block based on the ISP application indicator.

An image encoding method according to another aspect of the present disclosure may include determining whether a prediction mode of a current block is an intra prediction mode, determining whether intra sub-partitions (ISP) is available for the current block, when the prediction mode of the current block is an intra prediction mode, determining whether to apply ISP to the current block, when ISP is available for the current block, generating a prediction block for the current block by applying ISP to the current block, when ISP applies to the current block, and encoding information on the prediction mode of the current block and information on whether to apply ISP to the current block.

A transmission method according to another aspect of the present disclosure may transmit the bitstream generated by the image encoding apparatus or the image encoding method of the present disclosure.

A computer-readable recording medium according to another aspect of the present disclosure may store the bitstream generated by the image encoding apparatus or the image encoding method of the present disclosure.

A computer-readable recording medium according to another aspect of the present disclosure may store a bitstream received and decoded by an image decoding apparatus and used to reconstruct an image. The bitstream may include information on a prediction mode of a current block and an ISP application indicator indicating whether to apply ISP to the current block, the information on the prediction mode of the current block may be used to determine whether the prediction mode of the current block is an intra prediction mode, the ISP application indicator may be used to determine whether to apply ISP to the current block when the prediction mode of the current block is an intra prediction mode and it is determined that ISP is available for the current block, and the prediction block of the current block may be generated by performing ISP with respect to the current block upon determining that ISP applies to the current block.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

Also, according to the present disclosure, it is possible to provide a method and apparatus for encoding/decoding an image by applying ISP to images having various chroma formats.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIGS. 11a, 11b, and 11c are views illustrating a relationship between a luma component block (luma component array) and a chroma component block (chroma component array) according to a chroma format.

FIG. 16 is a view illustrating an example of splitting a chroma component block according to the ISP application method of FIG. 15.

FIG. 17 is a view illustrating an example of the structure of a bitstream in which a modified ISP availability condition is reflected.

FIG. 18 is a view illustrating another example of the structure of a bitstream in which a modified ISP availability condition is reflected.

MODE FOR INVENTION

Figure 1:
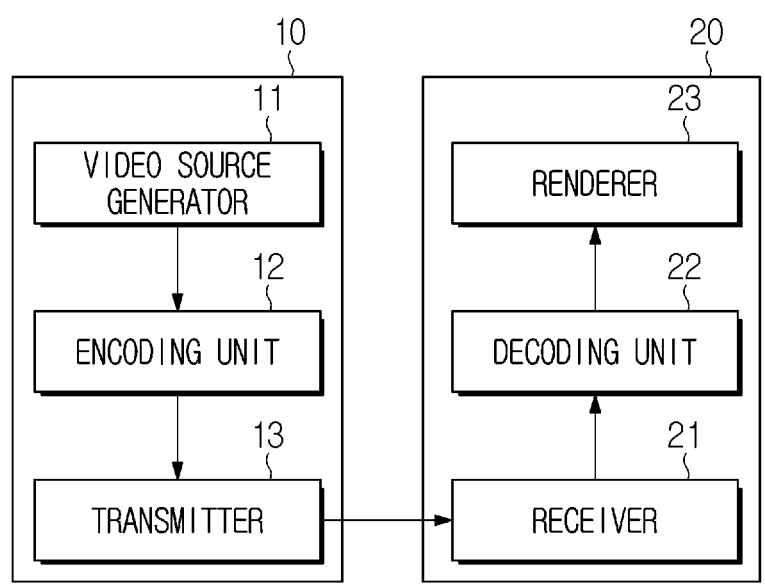
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
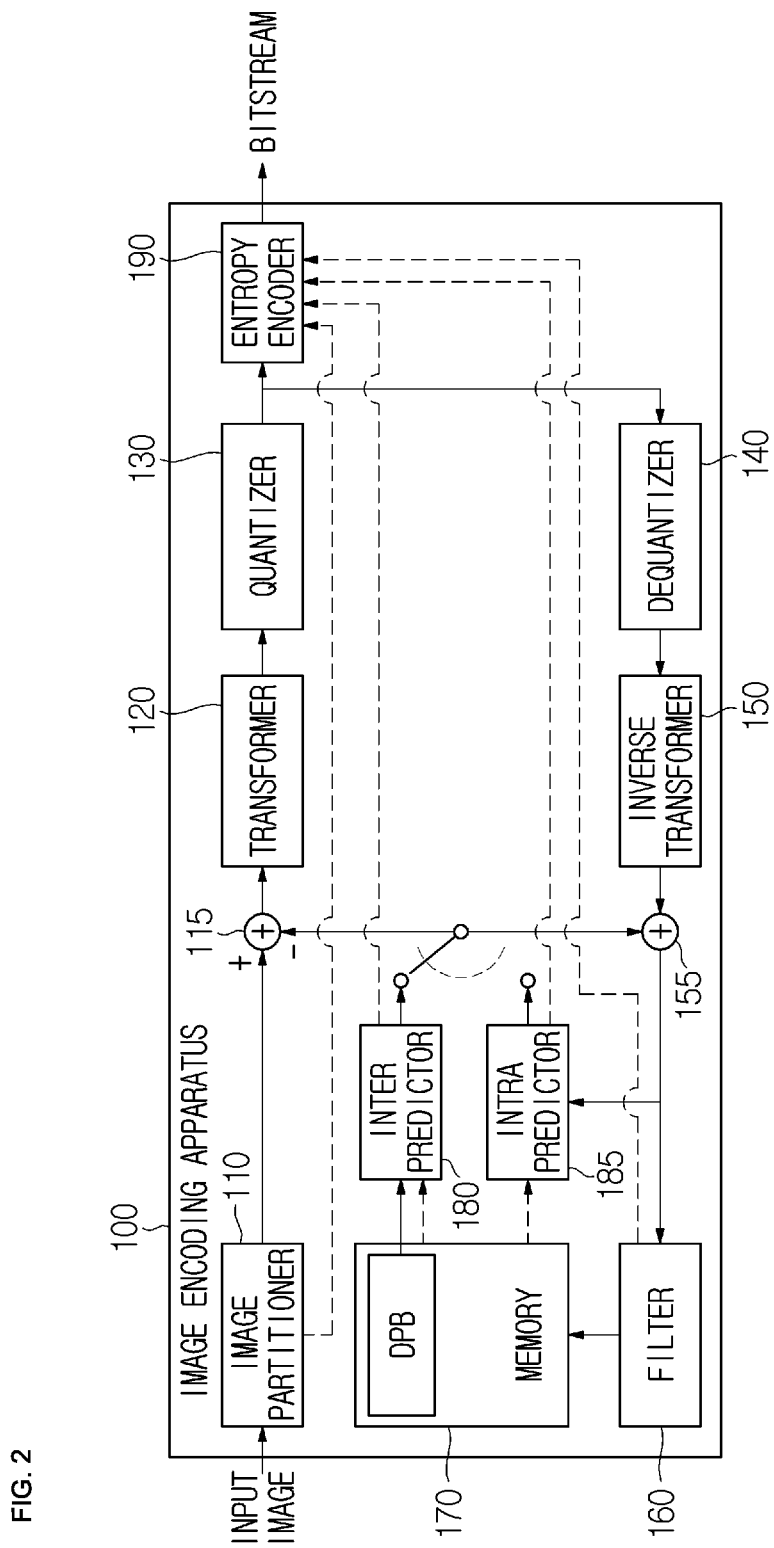
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be collectively referred to as a "predictor". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The predictor (the inter predictor 180 or the intra predictor 185) may perform prediction on a block to be processed (current block) and generate a predicted block including prediction samples for the current block. The predictor may determine whether intra prediction or inter prediction is applied on a current block or CU basis. The predictor may generate various information related to prediction of the current block and transmit the generated information to the entropy encoder 190. The information on the prediction may be encoded in the entropy encoder 190 and output in the form of a bitstream.

The intra predictor 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 185 may determine the prediction mode applied to the current block by using a prediction mode applied to a neighboring block.

The inter predictor 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter predictor 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The predictor may generate a prediction signal based on various prediction methods and prediction techniques described below. For example, the predictor may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the predictor may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance.

The prediction signal generated by the predictor may be used to generate a reconstructed signal or to generate a residual signal. The subtractor 115 may generate a residual signal (residual block or residual sample array) by subtracting the prediction signal (predicted block or prediction sample array) output from the predictor from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loeve transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter predictor 180 or the intra predictor 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

Meanwhile, as described below, luma mapping with chroma scaling (MCS) is applicable in a picture encoding process.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter predictor 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter predictor 180. The memory 170 may store the motion information of the block from which the motion information in the current picture is derived (or encoded) and/or the motion information of the blocks in the picture that have already been reconstructed. The stored motion information may be transmitted to the inter predictor 180 and used as the motion information of the spatial neighboring block or the motion information of the temporal neighboring block. The memory 170 may store reconstructed samples of reconstructed blocks in the current picture and may transfer the reconstructed samples to the intra predictor 185.

Overview of Image Decoding Apparatus

Figure 3:
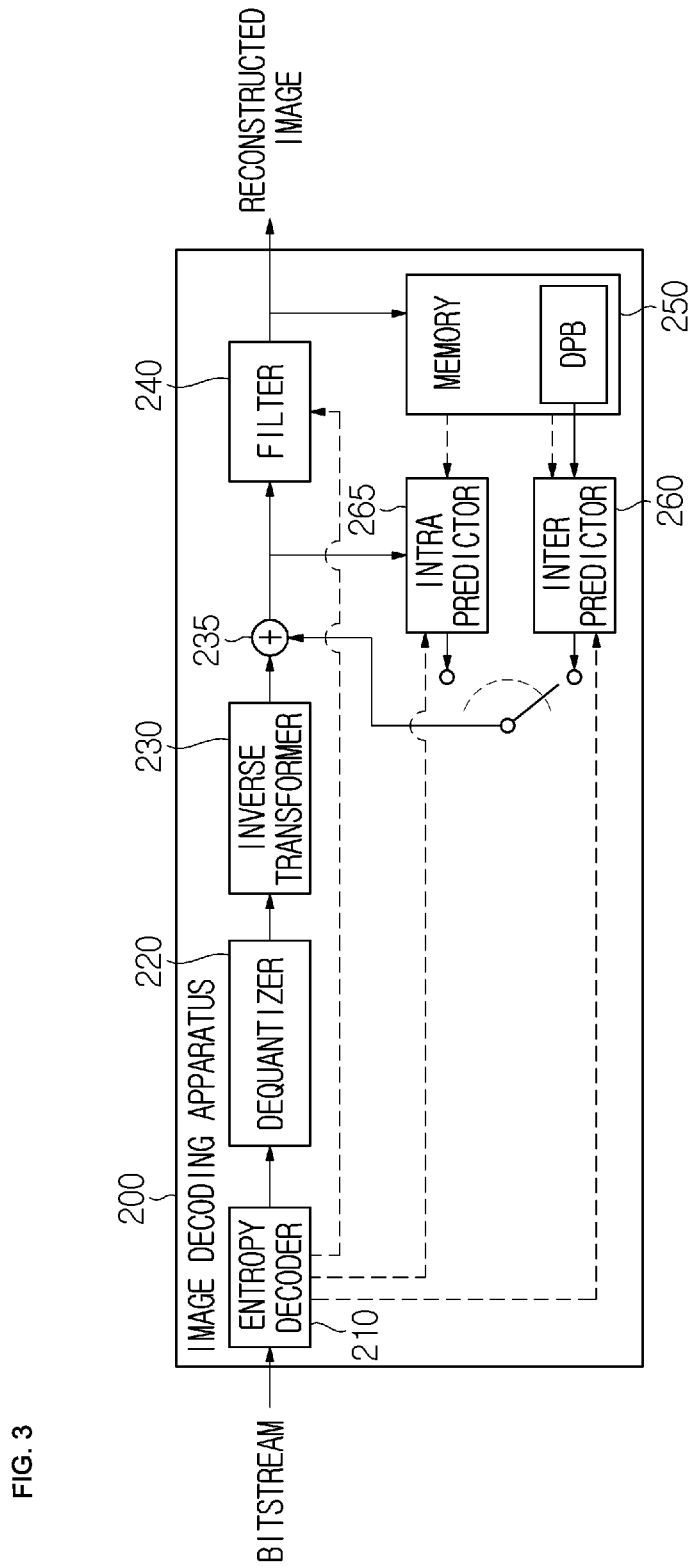
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively referred to as a "predictor". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the predictor (the inter predictor 260 and the intra predictor 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter predictor 160 or the intra predictor 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 210 and may determine a specific intra/inter prediction mode (prediction technique).

It is the same as described in the predictor of the image encoding apparatus 100 that the predictor may generate the prediction signal based on various prediction methods (techniques) which will be described later.

The intra predictor 265 may predict the current block by referring to the samples in the current picture. The description of the intra predictor 185 is equally applied to the intra predictor 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the predictor (including the inter predictor 260 and/or the intra predictor 265). The description of the adder 155 is equally applicable to the adder 235.

Meanwhile, as described below, luma mapping with chroma scaling (MCS) is applicable in a picture decoding process.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra predictor 265.

In the present disclosure, the embodiments described in the filter 160, the inter predictor 180, and the intra predictor 185 of the image encoding apparatus 100 may be equally or correspondingly applied to the filter 240, the inter predictor 260, and the intra predictor 265 of the image decoding apparatus 200.

Overview of Intra Prediction

Hereinafter, intra prediction according to an embodiment will be described.

Intra prediction may indicate prediction which generates prediction samples for a current block based on reference samples in a picture to which the current block belongs (hereinafter referred to as a current picture). When intra prediction applies to the current block, neighboring reference samples to be used for intra prediction of the current block may be derived. The neighboring reference samples of the current block may include a sample adjacent to a left boundary of the current block having a size of nW×nH and a total of 2×nH samples adjacent to the bottom-left, a sample adjacent to a top boundary of the current block and a total of 2×nW samples adjacent to the top-right, and one sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to a right boundary of the current block having a size of nW×nH, a total of nW samples adjacent to a bottom boundary of the current block, and one sample adjacent to the bottom-right of the current block.

Some of the neighboring reference samples of the current block have not yet been decoded or may not be available. In this case, a decoder may construct neighboring reference samples to be used for prediction, by substituting unavailable samples with available samples. Alternatively, neighboring reference samples to be used for prediction may be constructed using interpolation of available samples.

When the neighboring reference samples are derived, (i) a prediction sample may be derived based on average or interpolation of neighboring reference samples of the current block and (ii) the prediction sample may be derived based on a reference sample present in a specific (prediction) direction with respect to the prediction sample among the neighboring reference samples of the current block. The case of (i) may be referred to as a non-directional mode or a non-angular mode and the case of (ii) may be referred to as a directional mode or an angular mode.

In addition, the prediction sample may be generated through interpolation with a first neighboring sample located in a prediction direction of the intra prediction mode of the current block and a second neighboring sample located in the opposite direction based on a prediction target sample of the current block among the neighboring reference samples. The above-described case may be referred to as linear interpolation intra prediction (LIP).

In addition, chroma prediction samples may be generated based on luma samples using a linear model. This case may be called a linear model (LM) mode.

In addition, a temporary prediction sample of the current block may be derived based on filtered neighboring reference samples, and the prediction sample of the current block may be derived by weighted-summing the temporary prediction sample and at least one reference sample derived according to the intra prediction mode among the existing neighboring reference samples, that is, the unfiltered neighboring reference samples. This case may be referred to as position dependent intra prediction (PDPC).

In addition, a reference sample line with highest prediction accuracy may be selected from multiple neighboring reference sample lines of the current block to derive a prediction sample using a reference sample located in a prediction direction in the corresponding line, and, at this time, information (e.g., intra_luma_ref_idx) on the used reference sample line may be encoded and signaled in a bitstream. This case may be referred to as multi-reference line (MRL) intra prediction or MRL based intra prediction.

In addition, the current block may be split into vertical or horizontal sub-partitions to perform intra prediction with respect to each sub-partition based on the same intra prediction mode. At this time, neighboring reference samples of intra prediction may be derived in units of sub-partitions. That is, a reconstructed sample of a previous sub-partition in encoding/decoding order may be used as a neighboring reference sample of a current sub-partition. In this case, the intra prediction mode for the current block equally applies to the sub-partitions and the neighboring reference samples are derived and used in units of sub-partitions, thereby increasing intra prediction performance. Such a prediction method may be referred to as intra sub-partitions (ISP) or ISP based intra prediction.

The intra prediction technique may be referred to as various terms such as intra prediction type or additional intra prediction mode to be distinguished from a directional or non-directional intra prediction mode. For example, the intra prediction technique (intra prediction type or the additional intra prediction mode) may include at least one of LIP, LM, PDPC, MRL, ISP or MIP. Meanwhile, if necessary, post-filtering may be performed with respect to the derived prediction sample.

Specifically, the intra prediction procedure may include an intra prediction mode/type determination step, a neighboring reference sample derivation step and an intra prediction mode/type based prediction sample derivation step. In addition, if necessary, post-filtering may be performed with respect to the derived prediction sample.

Figure 4:
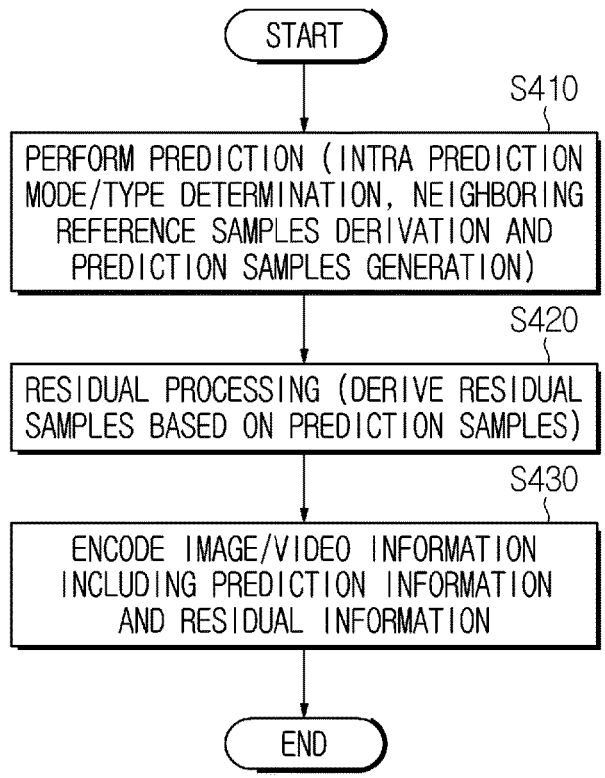
FIG. 4 is a flowchart illustrating an intra prediction based video/image encoding method.

FIG. 4 is a flowchart illustrating an intra prediction based video/image encoding method.

The encoding method of FIG. 4 may be performed by the image encoding apparatus of FIG. 2. Specifically, step S410 may be performed by the intra predictor 185, and step S420 may be performed by the residual processor. Specifically, step S420 may be performed by the subtractor 115. Step S430 may be performed by the entropy encoder 190. The prediction information of step S430 may be derived by the intra predictor 185, and the residual information of step S430 may be derived by the residual processor. The residual information is information on the residual samples. The residual information may include information on quantized transform coefficient for the residual samples. As described above, the residual samples may be derived as transform coefficient through the transformer 120 of the image encoding apparatus, and the transform coefficient may be derived as the transform coefficients quantized through the quantizer 130. The information on the quantized transform coefficients may be encoded by the entropy encoder 190 through a residual coding procedure.

The image encoding apparatus may perform intra prediction with respect to a current block (S410). The image encoding apparatus may determine an intra prediction mode/type for the current block, derive neighboring reference samples of the current block, and generate prediction samples in the current block based on the intra prediction mode/type and the neighboring reference samples. Here, the intra prediction mode/type determination, neighboring reference samples derivation and prediction samples generation procedures may be simultaneously performed or any one procedure may be performed before the other procedures.

Figure 5:
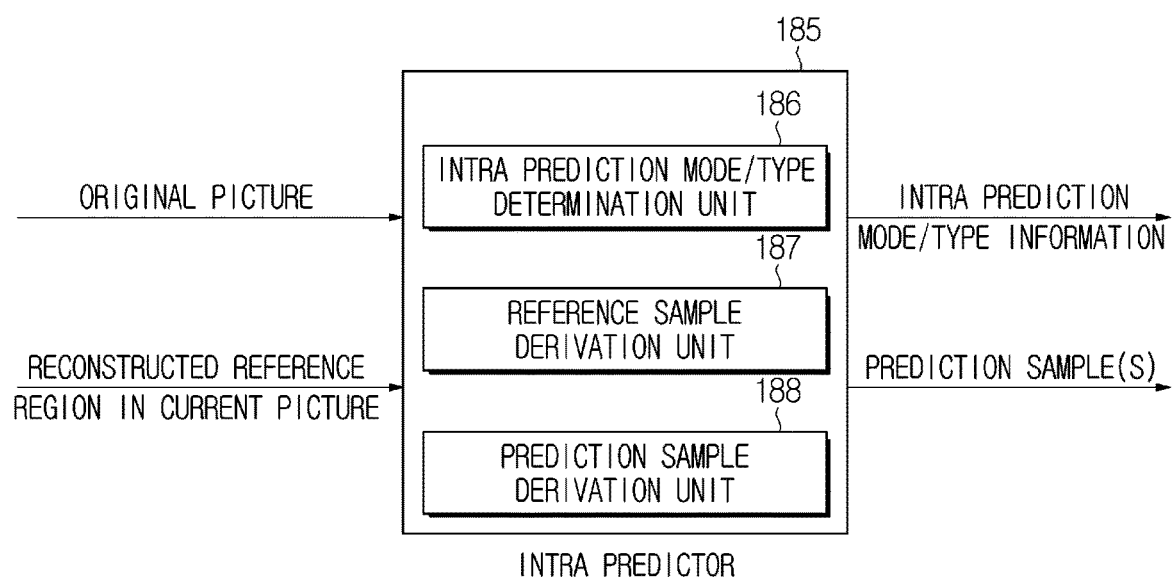
FIG. 5 is a view illustrating the configuration of an intra predictor 185 according to the present disclosure.

FIG. 5 is a view illustrating the configuration of an intra predictor 185 according to the present disclosure.

As shown in FIG. 5, the intra predictor 185 of the image encoding apparatus may include an intra prediction mode/type determination unit 186, a reference sample derivation unit 187 and/or a prediction sample derivation unit 188. The intra prediction mode/type determination unit 186 may determine an intra prediction mode/type for the current block. The reference sample derivation unit 187 may derive neighboring reference samples of the current block. The prediction sample derivation unit 188 may derive prediction samples of the current block. Meanwhile, although not shown, when the below-described prediction sample filtering procedure is performed, the intra predictor 185 may further include a prediction sample filter (not shown).

The image encoding apparatus may determine a mode/type applying to the current block among a plurality of intra prediction modes/types. The image encoding apparatus may compare rate distortion (RD) cost for the intra prediction modes/types and determine an optimal intra prediction mode/type for the current block.

Meanwhile, the image encoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

Referring to FIG. 4 again, the image encoding apparatus may generate residual samples for the current block based on the prediction samples or the filtered prediction samples (S420). The image encoding apparatus may derive the residual samples by subtracting the prediction samples from the original samples of the current block. That is, the image encoding apparatus may derive the residual sample values by subtracting the corresponding prediction sample value from the original sample value.

The image encoding apparatus may encode image information including information on the intra prediction (prediction information) and residual information of the residual samples. The prediction information may include the intra prediction mode information and/or the intra prediction technique information. The image encoding apparatus may output the encoded image information in the form of a bitstream. The output bitstream may be transmitted to the image decoding apparatus through a storage medium or a network.

The residual information may include residual coding syntax, which will be described later. The image encoding apparatus may transform/quantize the residual samples and derive quantized transform coefficients. The residual information may include information on the quantized transform coefficients.

Meanwhile, as described above, the image encoding apparatus may generate a reconstructed picture (including reconstructed samples and a reconstructed block). To this end, the image encoding apparatus may perform dequantization/inverse transform with respect to the quantized transform coefficients and derive (modified) residual samples. The reason for transforming/quantizing the residual samples and then performing dequantization/inverse transform is to derive the same residual samples as residual samples derived by the image decoding apparatus. The image encoding apparatus may generate a reconstructed bock including reconstructed samples for the current block based on the prediction samples and the (modified) residual samples. Based on the reconstructed block, the reconstructed picture for the current picture may be generated. As described above, an in-loop filtering procedure is further applicable to the reconstructed picture.

Figure 6:
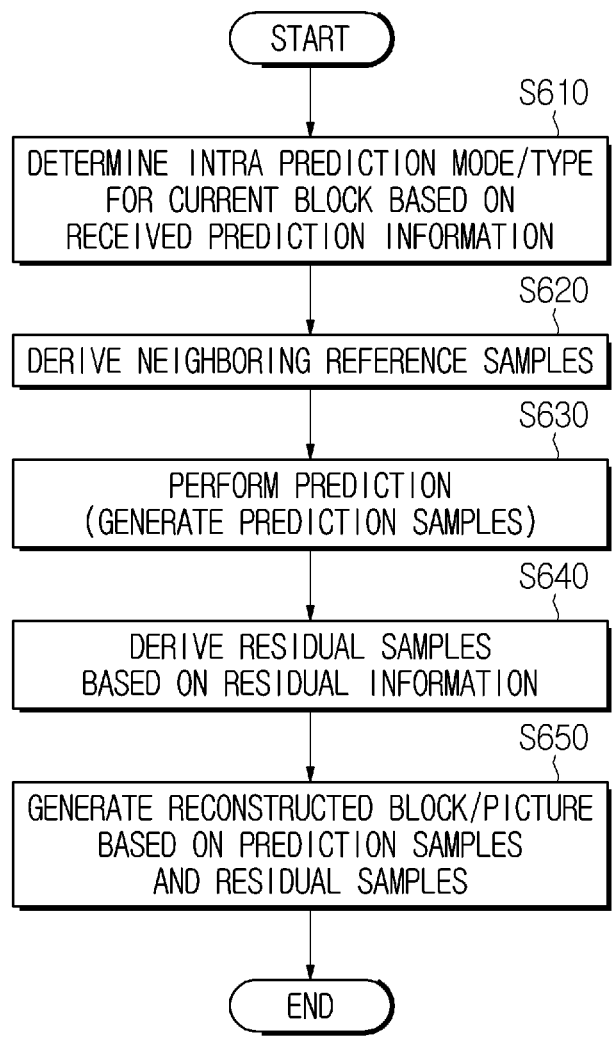
FIG. 6 is a flowchart illustrating an intra prediction based video/image decoding method.

FIG. 6 is a flowchart illustrating an intra prediction based video/image decoding method.

The image decoding apparatus may perform operation corresponding to operation performed by the image encoding apparatus.

The decoding method of FIG. 6 may be performed by the image decoding apparatus of FIG. 3. Steps S610 to S630 may be performed by the intra predictor 265, and the prediction information of step S610 and the residual information of step S640 may be obtained from a bitstream by the entropy decoder 210. The residual processor of the image decoding apparatus may derive residual samples for the current block based on the residual information (S640). Specifically, the dequantizer 220 of the residual processor may perform dequantization based on the dequantized transform coefficients derived based on the residual information to derive transform coefficients, and the inverse transformer 230 of the residual processor may perform inverse transform with respect to the transform coefficients to derive the residual samples for the current block. Step S650 may be performed by the adder 235 or the reconstructor.

Specifically, the image decoding apparatus may derive an intra prediction mode/type for the current block based on the received prediction information (intra prediction mode/type information) (S610). The image decoding apparatus may derive neighboring reference samples of the current block (S620). The image decoding apparatus may generate prediction samples in the current block based on the intra prediction mode/type and the neighboring reference samples (S630). In this case, the image decoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

The image decoding apparatus may generate residual samples for the current block based on the received residual information (S640). The image decoding apparatus may generate reconstructed samples for the current block based on the prediction samples and the residual samples and derive a reconstructed block including the reconstructed samples (S650). Based on the reconstructed block, the reconstructed picture for the current picture may be generated. An in-loop filtering procedure is further applicable to the reconstructed picture, as described above.

Figure 7:
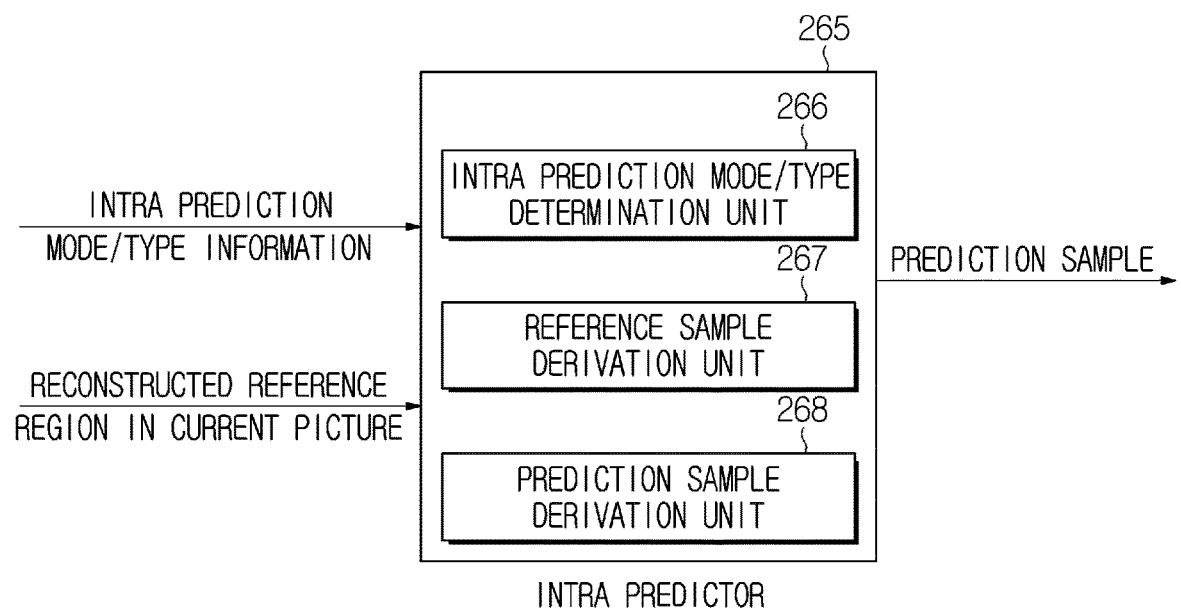
FIG. 7 is a view illustrating the configuration of an intra predictor 265 according to the present disclosure.

FIG. 7 is a view illustrating the configuration of an intra predictor 265 according to the present disclosure.

As shown in FIG. 7, the intra predictor 265 of the image decoding apparatus may include an intra prediction mode/type determination unit 266, a reference sample derivation unit 267 and a prediction sample derivation unit 268. The intra prediction mode/type determination unit 266 may determine an intra prediction mode/type for the current block based on the intra prediction mode/type information generated and signaled by the intra prediction mode/type determination unit 186 of the image encoding apparatus, and the reference sample derivation unit 267 may derive neighboring reference samples of the current block from a reconstructed reference region in a current picture. The prediction sample derivation unit 268 may derive prediction samples of the current block. Meanwhile, although not shown, when the above-described prediction sample filtering procedure is performed, the intra predictor 265 may further include a prediction sample filter (not shown).

The intra prediction mode information may include, for example, flag information (e.g., intra_luma_mpm_flag) indicating whether to apply a most probable mode (MPM) or a remaining mode to the current block, and, when the MPM applies to the current block, the intra prediction mode information may further include index information (e.g., intra_luma_mpm_idx) indicating one of the intra prediction mode candidates (MPM candidates). The intra prediction mode candidates (MPM candidates) may be composed of an MPM candidate list or an MPM list. In addition, when the MPM does not apply to the current block, the intra prediction mode information may further include remaining mode information (e.g., intra_luma_mpm_remainder) indicating one of the remaining intra prediction modes excluding the intra prediction mode candidates (MPM candidates). The image decoding apparatus may determine the intra prediction mode of the current block based on the intra prediction mode information. The MPM candidate modes may include the intra prediction modes of the neighboring blocks (e.g., the left neighboring block and the upper neighboring block) of the current block and additional candidate modes.

Figure 8A:
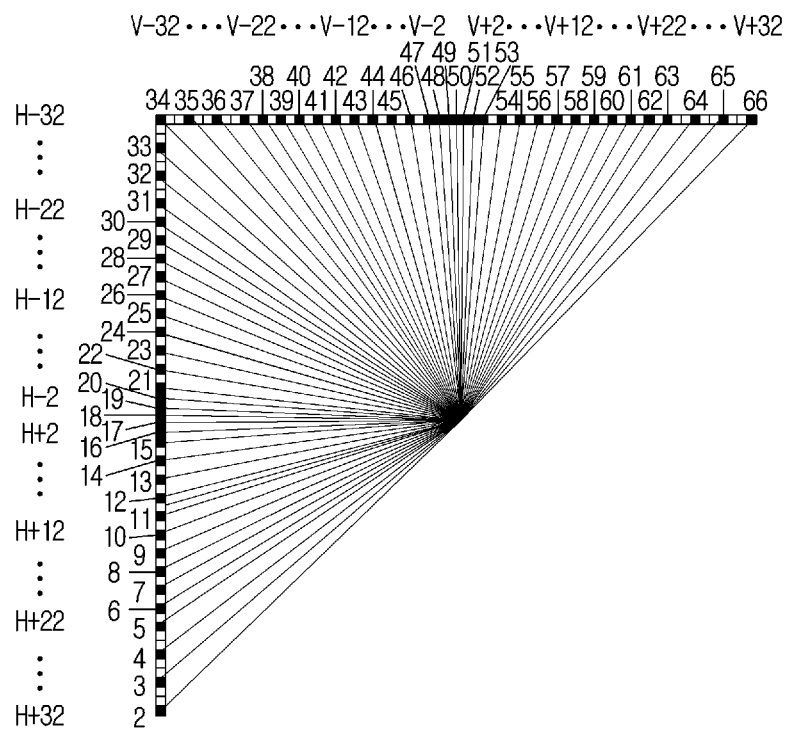
FIGS. 8a and 8b are views illustrating an intra prediction direction according to an embodiment of the present disclosure.

FIG. 8a shows an intra prediction direction according to an embodiment of the present disclosure. In order to capture any edge direction presented in natural video, as shown in FIG. 8a, the intra prediction mode may include two non-directional intra prediction modes and 65 directional intra prediction modes. The non-directional intra prediction modes may include a planar intra prediction mode (planar mode) and a DC intra prediction mode (DC mode), and the directional intra prediction modes may include second to $66^{th}$ intra prediction modes.

Meanwhile, the intra prediction mode may further include a cross-component linear model (CCLM) mode for chroma samples in addition to the above-described intra prediction modes. The CCLM mode may be split into L_CCLM, T_CCLM, LT_CCLM according to whether left samples, upper samples or both thereof is considered for LM parameter derivation and may apply only to a chroma component.

For example, the intra prediction mode may be, for example, indexed as shown in the following table.

TABLE 1

| Intra prediction mode | Associated name |
|---|---|
| 0 | INTRA_PLANAR |
| 1 | INTRA_DC |
| 2..66 | INTRA_ANGULAR2..INTRA_ANGULAR66 |
| 81..83 | INTRA_LT_CCLM, INTRA_L_CCLM, INTRA_T_CCLM |

Figure 8B:
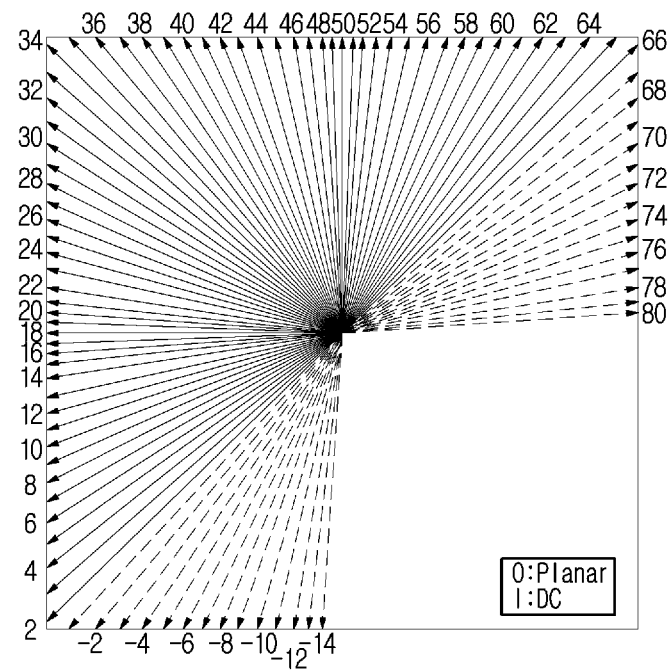

FIG. 8b shows an intra prediction direction according to another embodiment of the present disclosure. In FIG. 8b, a dotted-line direction shows a wide angle mode applying only to a non-square block. As shown in FIG. 8b, in order to capture any edge direction presented in natural video, the intra prediction mode according to an embodiment may include two non-directional intra prediction modes and 93 directional intra prediction modes. The non-directional intra prediction modes may include a planar mode and a DC mode, and the directional intra prediction modes may include second to $80^{th}$ and $-1^{st}$ to $-14^{th}$ intra prediction modes, as denoted by arrow of FIG. 8b. The planar mode may be denoted by INTRA_PLANAR, and the DC mode may be denoted by INTRA_DC. In addition, the directional intra prediction mode may be denoted by INTRA_ANGULAR−14 to INTRA_ANGULAR−1 and INTRA_ANGULAR2 to INTRA_ANGULAR80. In addition, the intra prediction technique information may be implemented in various forms. For example, the intra prediction technique information may include intra prediction type index information indicating one of the intra prediction techniques. As another example, the intra prediction technique information may include at least one of reference sample line information (e.g., intra_luma_ref_idx) indicating whether to apply MRL to the current block and, if applied, which reference sample line is used, ISP flag information (e.g., intra_subpartitions_mode_flag) indicating whether to apply ISP to the current block, ISP type information (e.g., intra_subpartitions_split_flag) indicating the split type of sub-partitions when applying ISP, flag information indicating whether to apply PDPC, or flag information indicating whether to apply LIP. In the present disclosure, ISP flag information may be referred to as an ISP application indicator.

The intra prediction mode information and/or the intra prediction technique information may be encoded/decoded through the coding method described in the present disclosure. For example, the intra prediction mode information and/or the intra prediction technique information may be encoded/decoded through entropy coding (e.g., CABAC, CAVLC) based on a truncated (rice) binary code.

Before determining whether to apply a predetermined intra prediction technique to a current block, whether the corresponding intra prediction technique is available for the current block may be first determined. For example, whether the corresponding intra prediction technique is available for the current block may be determined based on the coding parameters of the current block. In this case, the coding parameters may include a size (width and/or height) of the current block, a position of the current block, a color component of the current block or whether to apply another intra prediction technique.

In addition, determination as to whether the corresponding intra prediction technique is available for the current bock may be performed based on information signaled at a higher level of the current block, such as a sequence, a picture, a slice and a CTU. For example, when information transmitted at a sequence level indicates that the predetermined intra prediction technique is not available, it may be determined that the corresponding intra prediction technique is not available for blocks belonging to the corresponding sequence.

Upon determining that the predetermined intra prediction technique is available for the current block, the image encoding apparatus may determine whether to apply the corresponding intra prediction technique to the current block using various methods. For example, the image encoding apparatus may determine whether to apply the corresponding intra prediction technique based on RDO.

The image encoding apparatus may encode and signal an intra prediction technique information in a bitstream. The intra prediction technique information may be encoded according to the corresponding intra prediction technique in various forms. For example, when the intra prediction technique is MRL, the intra prediction technique information may be an index (e.g., intra_luma_ref_idx) indicating a reference line used for prediction of the current block among multiple reference lines. When the intra prediction technique is ISP, the intra prediction technique information may be flag information (e.g., intra_subpartitions_mode_flag) indicating whether to apply ISP to the current block. In addition, when applying ISP, the intra prediction technique information may further include information (e.g., intra_subpartitions_split_flag) on a split direction. In addition, the intra prediction technique information may include flag information indicating whether to apply PDPC, flag information indicating whether to apply LIP or flag information indicating whether to apply an LM mode.

In case it is determined that the predetermined intra prediction technique is available for the current block, the image decoding apparatus may determine whether to apply the corresponding intra prediction technique to the current block based on the signaled intra prediction technique information.

As another example, whether to apply the predetermined intra prediction technique to the current block may be implicitly derived by the image encoding apparatus and the image decoding apparatus based on coding parameters for the current block in addition to the explicitly signaled intra prediction technique information. In this case, the coding parameter may include a size (width and/or height) of the current block, a position of the current block, a color component of the current block or whether to apply another intra prediction technique.

Hereinafter, an ISP mode according to the present disclosure will be described in detail.

The current block may include a luma component block (array) and a chroma component block (array) corresponding thereto. In the present disclosure, the "current block" or the "luma component block" may mean a "luma component block of a current block", and the "chroma component block" or the "corresponding chroma component block" may mean a "chroma component block of the current block". In addition, the "luma component block" may be referred to as the term "luma block", "luminance component block" or "luminance block", and the "chroma component block" may be referred to as the term "chroma block", "chrominance component block" or "chrominance block".

In conventional intra prediction, a current coding/decoding target block (current block) is regarded as one unit and thus coding/decoding is performed without split. However, when applying an ISP mode, the current block is split in a horizontal or vertical direction to perform intra prediction encoding/decoding. In this case, encoding/decoding is performed in units of split sub-partitions to generate a reconstructed sub-partition and the reconstructed sub-partition is used as a reference block of a next split sub-partition.

Whether ISP is available for the current block may be determined based on the following conditions of table 2. The following conditions may be determined based on the luma component block of the current block. That is, in the following conditions, the width, height and position of the current block may mean the width, height and position of the luma component block of the current block, respectively.

TABLE 2

<ISP availability conditions>
- intra_luma_ref_idx[ x0 ][ y0 ] = = 0
- cbWidth <= MaxTbSizeY || cbHeight <= MaxTbSizeY
- cbWidth * cbHeight > MinTbSizeY * MinTbSizeY For example, when all of the above conditions for the current block are satisfied, it may be determined that ISP is available for the current block. After determining that ISP is available for the current block, it may be determined whether to apply ISP to the current block. In the ISP availability conditions, (x0, y0) is coordinates indicating the location of the top-left sample of the current block. In addition, intra_luma_ref_idx[x0][y0] is information indicating a reference line used for prediction of the current block. According to the ISP availability conditions, when intra_luma_ref_idx is 0, that is, when a reference line used for prediction of the current block is line 0 (a reference line immediately adjacent to the current block), it may be determined that ISP is available for the current block. When a reference line used for prediction of the current block is a line other than line 0, it may be determined that ISP is not available for the current block.

In the ISP availability conditions, cbWidth and cbHeight correspond to the width and height of the current block, respectively. In addition, MaxTbSizeY and MinTbSizeY may indicate a maximum transform size and a minimum transform size, respectively. As described above, the residual processing may include transform or inverse transform. In this case, a size of a transform block in which transform or inverse transform is available may be predefined or signaled through a bitstream. That is, the maximum transform size means a maximum size of a transform block in which transform or inverse transform may be performed. In addition, the minimum transform size means a minimum size of a transform block in which transform or inverse transform may be performed. For example, when the size of the current block is greater than the maximum transform size, the current block may be split into two or more transform blocks. In addition, the current block may not be split into transform blocks having a size less than the minimum transform size. The maximum transform size and/or the minimum transform size may be predefined in the image encoding apparatus and the image decoding apparatus or may be derived based on information signaled at a higher level of a block.

According to the ISP availability conditions, only when at least one of cbWidth or cbHeight is equal to or less than MaxTbSizeY, it may be determined that ISP is available for the current block. That is, when both cbWidth and cbHeight are greater than MaxTbSizeY, it may be determined that ISP is not available for the current block. When cbWidth is greater than MaxTbSizeY, cbHeight is equal to or less than MaxTbSizeY and ISP applies to the current block, an ISP split direction may be determined as a vertical direction as described below. When cbHeight is greater than MaxTbSizeY, cbWidth is equal to or less than MaxTbSizeY and ISP applies to the current block, an ISP split direction may be determined as a horizontal direction as described below.

According to the ISP availability conditions, when cbWidth*cbHeight is greater than MinTbSizeY*MinTbSizeY, it may be determined that ISP is available for the current block. cbWidth*cbHeight may mean the area of the current block or the number of samples included in the current block. For example, if MinTbSizeY is 4, it may be determined that ISP is available for the current block only when the number of samples included in the curent block is greater than 16(4*4).

Figure 9:
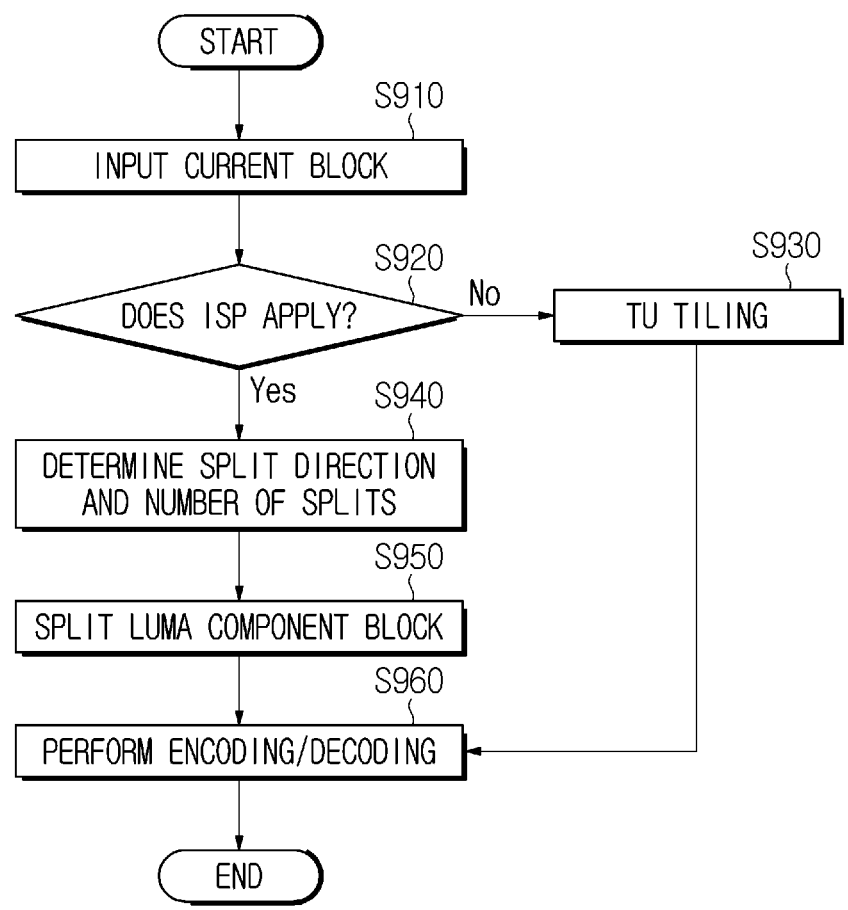
FIG. 9 is a view illustrating a conventional method of performing encoding/decoding of a current block according to an ISP mode.

FIG. 9 is a view illustrating a conventional method of performing encoding/decoding of a current block according to an ISP mode.

When a current block to be encoded/decoded is input (S910), it may be determined whether to apply ISP to the current block (S920). Determination of step S920 may include determining whether ISP is available for the current block and/or determining whether to apply ISP to the current block. The determination as to whether ISP is available for the current block may be made based on the above-described ISP availability conditions. When ISP is available, the image encoding apparatus may determine whether to apply ISP to the current block based on various methods as described above, and the result of determination may be encoded in a bitstream as intra prediction technique information. When ISP is available, the image decoding apparatus may determine whether to apply ISP to the current block based on the signaled intra prediction technique information.

When ISP does not apply to the current block, TU tiling may be performed with respect to the current block (S930). TU tiling means a process of splitting the current block into a plurality of transform blocks such that the width and height of the current block are equal to or less than a maximum transform size which is a transformable size. As described above, processing of the residual signal includes transform, and the maximum transform size means a maximum size of a transform block in which a transform process may be performed. Accordingly, when the width or height of the current block is greater than the maximum transform size, by splitting the current block through TU tiling, both the width and height of the split block may be equal to or less than the maximum transform size. For example, when the maximum transform size is a size of 64 samples and the current block has a size of 128×128, the current block may be split into four 64×64 blocks. Alternatively, when the maximum transform size is a size of 64 samples and the current block has a size of 64×128 or 128×64, the current block may be split into two 64×64 blocks. For example, the maximum transform size is a size of 64 samples and the current block has a size of 64×64 or less, TU tiling may not be performed.

Thereafter, encoding/decoding may be performed with respect to the current block or each of the blocks split through the TU tiling step (S960). Encoding of step S960 may include intra prediction, residual processing and/or encoding of prediction information and residual information. Encoding of step S960 may include intra prediction, residual samples derivation and/or reconstructed block generation.

In step S920, when applying ISP to the current block, a split direction and the number of splits (the number of sub-partitions) may be determined (S940).

In step S920, the split direction may be derived based on information (e.g., intra_subpartitions_split_flag) signaled through a bitstream. Alternatively, the split direction may be implicitly derived based on the size of the current block. For example, as described above, when the width of the current block is greater than the maximum transform size, the split direction of ISP may be derived in a vertical direction. In addition, when the height of the current block is greater than the maximum transform size, the split direction of ISP may be derived in a horizontal direction. In addition, when both the width and height of the current block are greater than the maximum transform size, restriction may be imposed such that ISP is not available for the current block. For example, when the maximum transform size is a size of 64 samples and the current block to which ISP applies is a 128×64 block, the split direction of ISP is derived in a vertical direction and both the width (128/4) and height (64) of the sub-partition are determined as a maximum transform size (64) or less. Similarly, when the maximum transform size is a size of 64 samples and the current block to which ISP applies is a 64×128 block, the split direction of ISP is derived in a horizontal direction and both the width (64) and height (128/4) of the sub-partition are determined as a maximum transform size (64) or less. As described above, when applying ISP to the current block, the current block is split such that both the width and height of sub-partitions is equal to or less than the maximum transform size. For this reason, TU tiling of step S930 does not need to be performed with respect to the current block to which ISP applies.

In step S940, the number of splits may be implicitly derived based on the size of the current block. Specifically, the current block may be split according to the size of the current block, as shown in Table 3.

TABLE 3

| Block size | Number of splits |
|---|---|
| 4 × 4 | No split |
| 4 × 8, 8 × 4 | 2 |
| All other cases | 4 |

Figure 10A:
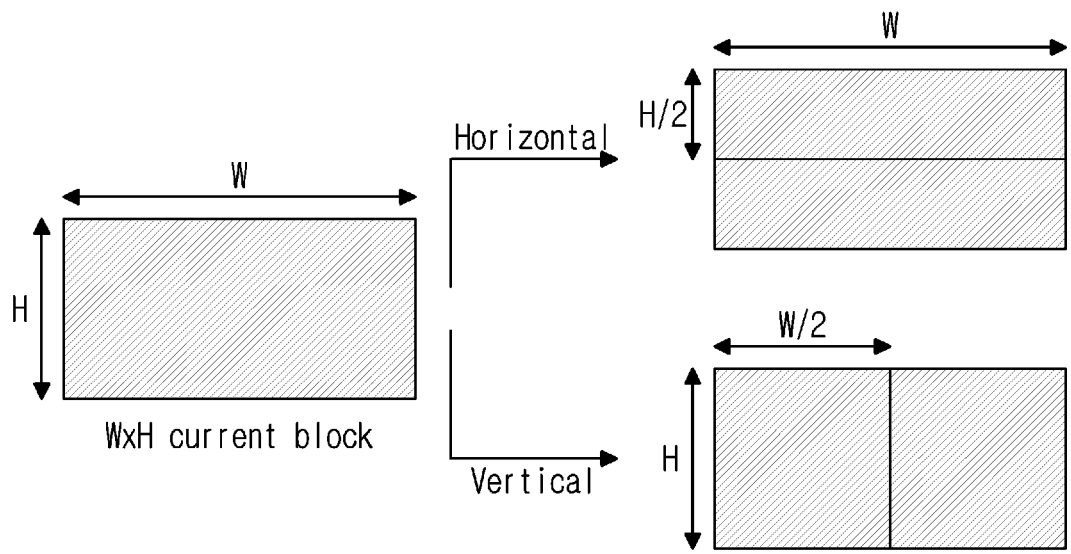
FIGS. 10a and 10b are views illustrating a split example of ISP for current blocks having various sizes.

FIG. 10a is a view illustrating a split example of ISP for a 4×8 block or 8×4 block. As shown in FIG. 10a, the 4×8 block or 8×4 block may be split into two sub-partitions. When the current block is a 4×8 block and is split in a horizontal direction, the current block may be split into two 4×4 sub-partitions. When the current block is a 4×8 block and is split in a vertical direction, the current block may be split into two 2×8 sub-partitions. When the current block is an 8×4 block and is split in a horizontal direction, the current block may be split into two 8×2 sub-partitions. When the current block is an 8×4 block and is split in a vertical direction, the current block may be split into two 4×4 sub-partitions.

Figure 10B:
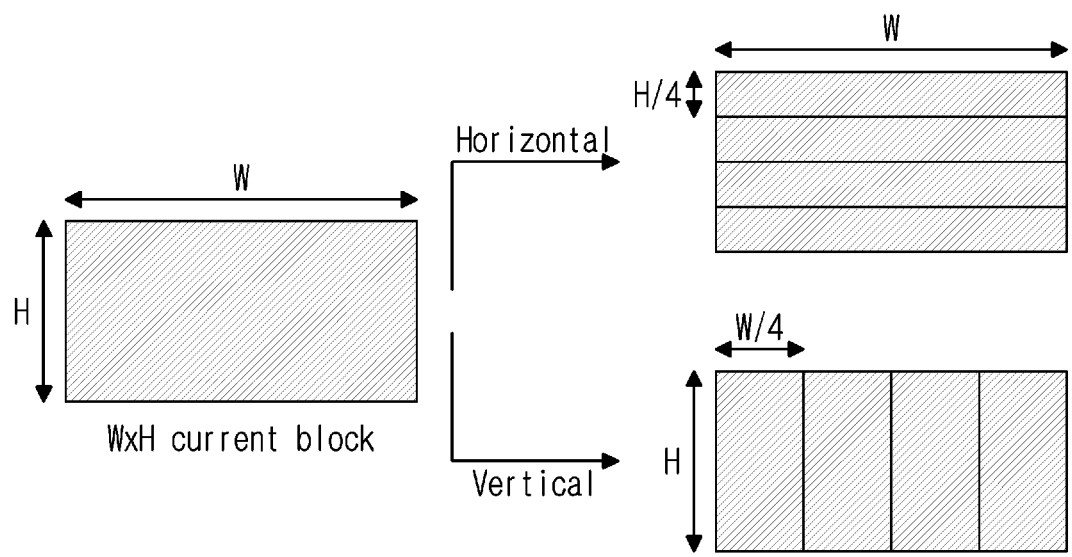

FIG. 10b is a view illustrating a split example of ISP for a block having a size of 8×8 or more.

As shown in FIG. 10b, a block having a size of 8×8 or more may be split into four sub-partitions. When the current block is a W×H block, both W and H are 8 or more and the current bock is split in a horizontal direction, the current block may be split into four W×(H/4) sub-partitions. When the current block is a W×H block, both W and H are 8 or more, and the current block is split in a vertical direction, the current block may be split into four (W/4)×H sub-partitions.

Referring to FIG. 9 again, when the split direction and the number of splits are determined in step S940, the luma component block of the current block may be split based on this (S950).

Thereafter, encoding/decoding may be performed with respect to each split sub-partition (S960). As described above, encoding of step S960 may include intra prediction, residual processing and/or encoding of prediction information and residual information. In addition, decoding of step S960 may include intra prediction, residual samples derivation and/or reconstructed block generation. Specifically, when applying ISP, the intra prediction mode for the current block equally applies to the sub-partitions, and a neighboring reference sample is derived and used in units of sub-partitions, thereby increasing intra prediction performance. That is, when applying ISP, a residual sample processing procedure is performed in units of sub-partitions. In other words, intra prediction samples are derived for each sub-partition, and a residual signal (residual samples) for the corresponding sub-partition is added thereto, thereby obtaining reconstructed samples. The residual signal (residual samples) may be derived through a dequantization/inverse transform procedure based on residual information (quantized transform coefficient information or residual coding syntax) in the above-described bitstream. That is, prediction samples derivation and residual samples derivation for a first sub-partition may be performed and reconstructed samples for the first sub-partition may be derived based on this. In this case, when deriving prediction samples for a second sub-partition, some of the reconstructed samples in the first sub-partition (e.g., reconstructed samples adjacent to the left or upper side of the second sub-partition) may be used as neighboring reference samples for the second sub-partition. Similarly, prediction samples derivation and residual samples derivation for the second sub-partition may be derived, and reconstructed samples for the second sub-partition may be derived based on this. In this case, when prediction samples for a third sub-partition are derived, some of the reconstructed samples in the second sub-partition (e.g., reconstructed samples adjacent to the left or upper side of the third sub-partition) may be used as neighboring reference samples for the third sub-partition. Similarly, some of the reconstructed samples in the third sub-partition may be used as neighboring reference samples for a fourth sub-partition.

The order of encoding/decoding among a plurality of sub-partitions is from top to bottom when the split direction is a horizontal direction and is from left to right when the split direction is a vertical direction. For example, in FIG. 10b, when the split direction is a horizontal direction, sub-partitions may be sequentially encoded/decoded from the uppermost sub-partition to the lowermost sub-partition. In addition, when the split direction is a vertical direction, sub-partitions may be sequentially encoded/decoded from the leftmost sub-partition to the rightmost sub-partition.

When applying ISP to the current block, in order to reduce coding complexity, an MPM list is generated according to each split method (horizontal split and vertical split) and a suitable prediction mode among prediction modes in the generated MPM list is compared in terms of rate distortion optimization (RDO) to generate an optimal mode. In addition, when multi-reference line (MRL) intra prediction is used, restriction may be imposed such that the above-described ISP is not used. That is, when a $0^{th}$ reference line is used (e.g., intra_luma_ref_idx==0), ISP is applicable. In addition, when applying ISP, restriction may be imposed such that the above-described PDPC is not used. That is, when applying ISP, PDPC may not be used.

When applying ISP, as intra prediction technique information, information (intra_subpartitions_mode_flag) indicating whether to apply ISP may be transmitted in units of current blocks, and if the current block uses ISP (e.g., when intra_subpartitions_mode_flag is 1), information (intra_subpartitions_split_flag) on the split method (horizontal split or vertical split) may be transmitted.

According to the conventional method described with reference to FIG. 9, in a single tree structure in which the luma component block of the current block and the chroma component block of the current block are split into the same tree structure, when applying ISP to the current block, the luma component block is split into a plurality of sub-partitions but ISP does not apply to the chroma component block. In this case, the width or height of the chroma component block becomes greater than the maximum transform size according to the chroma format and thus transform or inverse transform of the chroma component block may become impossible.

Hereinafter, a relationship between the size of the luma component block and the size of the chroma component block according to the chroma format will be described.

FIG. 11 is a view illustrating a relationship between a luma component block (luma component array) and a chroma component block (chroma component array) according to a chroma format.

A source or coded picture/image may include a luma component (Y) block and two chroma component (cb, cr)

blocks. That is, one pixel of the picture/image may include a luma sample and two chroma samples (cb, cr). A color format may represent a configuration format of a luma sample and chroma samples (cb, cr), and may be referred to as a chroma format. The chroma format may be predefined or may be adaptively signaled. For example, the chroma format may be signaled based on at least one of chroma_format_idc or separate_colour_plane_flag as shown in Table 4.

TABLE 4

| chroma_format_idc | separate_colour_plane_flag | ChromaArrayType | Chroma format | SubWidthC | SubHeightC |
|---|---|---|---|---|---|
| 0 | 0 | 0 | Monochrome | 1 | 1 |
| 1 | 0 | 1 | 4:2:0 | 2 | 2 |
| 2 | 0 | 2 | 4:2:2 | 2 | 1 |
| 3 | 0 | 3 | 4:4:4 | 1 | 1 |
| 3 | 1 | 0 | 4:4:4 | 1 | 1 |

In Table 4 above, chroma_format_idc is information indicating the format of a luma sample and a chroma sample corresponding thereto, and separate_colour_plane_flag is information indicating three color components Y, cb and cr are separately encoded in a 4:4:4 chroma format. In Table 4 above, when chroma_format_idc is 0, the chroma format corresponds to monochrome, and the current block does not include the chroma component block and includes only the luma component block.

In Table 4 above, when chroma_format_idc is 1, the chroma format corresponds to a 4:2:0 chroma format, and the width and height of the chroma component block respectively correspond to half the width and half the height of the luma component block. FIG. 11a shows the location relationship between the luma sample and the chroma sample in a 4:2:0 chroma format.

In Table 4 above, when chroma_format_idc is 2, the chroma format corresponds to a 4:2:2 chroma format, the width of the chroma component block respectively correspond to half the width of the luma component block, and the height of the chroma component block is equal to that of the luma component block. FIG. 11b shows the location relationship between the luma sample and the chroma sample in a 4:2:2 chroma format.

Figure 11C:
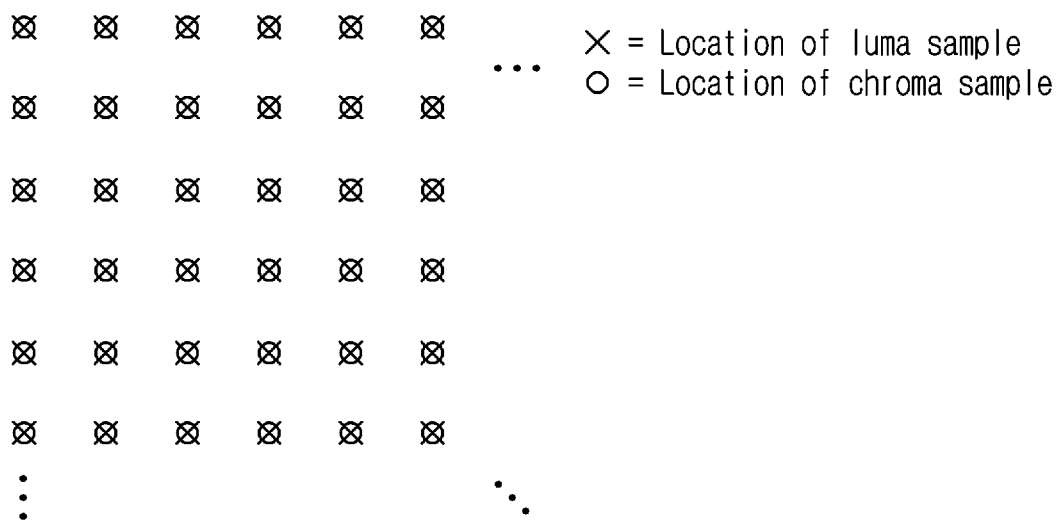

In Table 4 above, when chroma_format_idc is 3, the chroma format corresponds to a 4:4:4 chroma format, and the width and height of the chroma component block respectively correspond to the width and height of the luma component block. FIG. 11c shows the location relationship between the luma sample and the chroma sample in a 4:4:4 chroma format.

In Table 4 above, SubWidthC and SubHeightC represent a ratio of the luma sample and the chroma sample. For example, when the width and height of the luma component block are respectively CbWidth and CbHeight, the width and height of the chroma component block corresponding thereto may be derived as (CbWidth/SubwidthC) and (CbHeight/SubHeightC), respectively.

As described with reference to FIG. 11, the size of the chroma component block corresponding to the luma component block of the current block may vary according to the chroma format.

Figure 12:
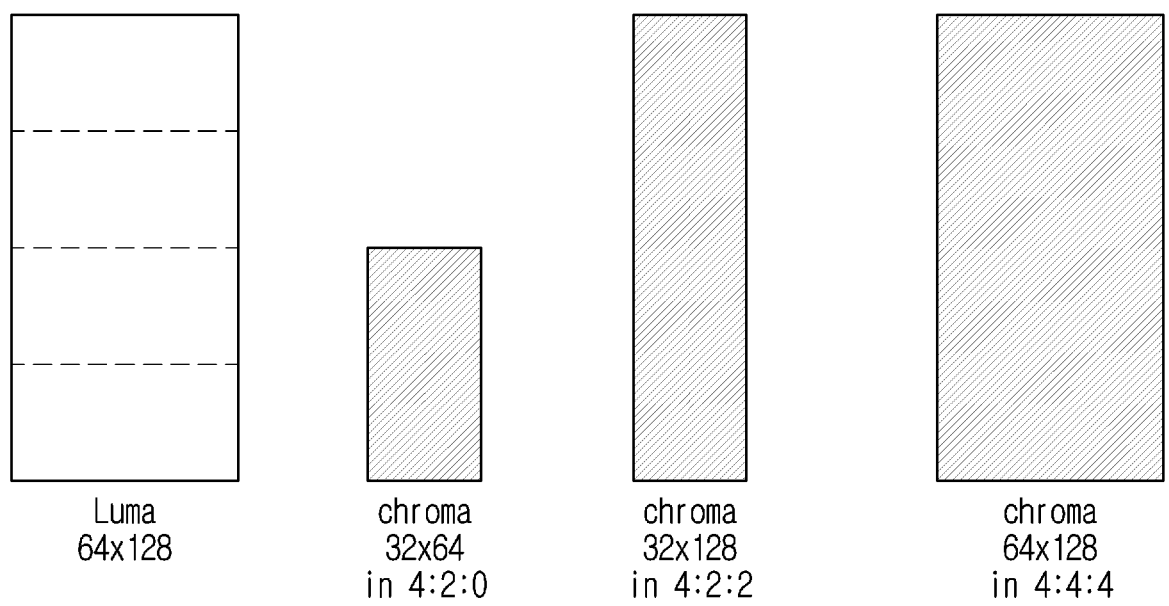
FIG. 12 is a view illustrating the size of a chroma component block according to a chroma format when a luma component block is a 64×128 block.

FIG. 12 is a view illustrating the size of a chroma component block according to a chroma format when a luma component block is a 64×128 block. As shown in FIG. 12, a chroma component block corresponding to a 64×128 luma component block may be a 32×64 block in a 4:2:0 chroma format, a 32×128 block in a 4:2:2 chroma format, and a 64×128 block in a 4:4:4 chroma format.

As described above, according to the conventional method described with reference to FIG. 9, in a single tree structure in which the luma component block and the chroma component block are split into the same tree structure, when applying ISP to the current block, the luma component block is split into a plurality of sub-partitions, but the chroma component block is not split. For example, when the luma component block of the current block to which ISP applies is a 64×128 block, since a split direction is determined as a horizontal direction, the luma component block is split into four 64×32 sub-partitions, and both the width (64) and height (32) of each sub-partition is equal to or less than a maximum transform size (64). Accordingly, transform or inverse transform of each of the sub-partitions for the luma component block may be performed. However, as shown in FIG. 12, the chroma component block is a 32×64 block in a 4:2:0 chroma format, a 32×128 block in a 4:2:2 chroma format or a 64×128 block in a 4:4:4 chroma format, and, for example, in the 4:2:2 chroma format and the 4:4:4 chroma format, since the height (128) of the chroma component block is greater than the maximum transform size (64), transform or inverse transform of the chroma component block is impossible.

Hereinafter, various embodiments of the present disclosure for solving the above problems will be described in detail.

Embodiment #1

In Embodiment #1 of the present disclosure, in order to solve the conventional problems, when applying ISP to the current block, ISP adaptively applies to the chroma component block based on the chroma format and/or the size of the chroma component block. According to Embodiment #1 of the present disclosure, for example, when applying ISP to the chroma component block, the split direction and the number of splits determined with respect to the luma component block is equally applicable to the chroma component block.

Figure 13:
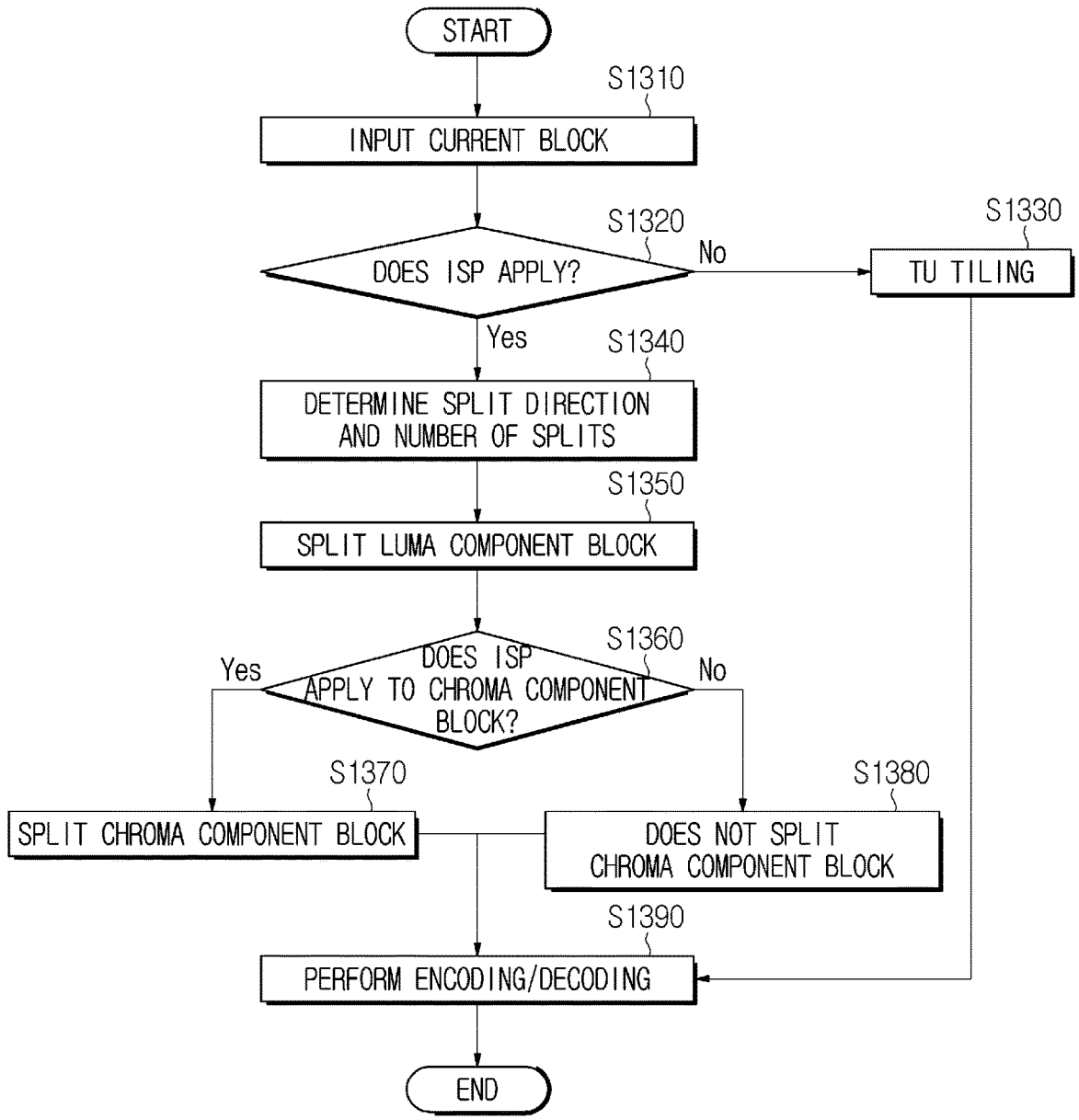
FIG. 13 is a flowchart illustrating an ISP application method according to an embodiment of the present disclosure.

FIG. 13 is a flowchart illustrating an ISP application method according to an embodiment of the present disclosure.

Figure 14:
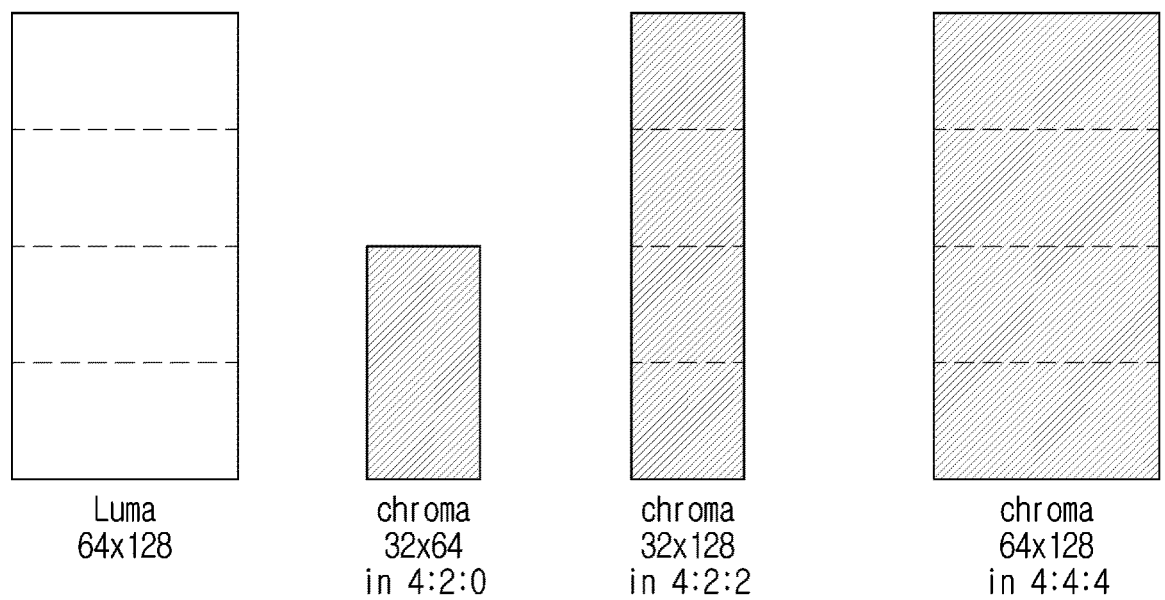
FIG. 14 is a view illustrating an example of splitting a chroma component block according to the ISP application method of FIG. 13.

FIG. 14 is a view illustrating an example of splitting a chroma component block according to the ISP application method of FIG. 13.

When a current block to be encoded/decoded is input (S1310), it may be determined whether to apply ISP to the current block (S1320). Determination of step S1320 may include determining whether ISP is available for the current block and/or whether to apply ISP to the current block. The determination as to whether ISP is available for the current block may be performed based on the above-described ISP availability conditions. When ISP is available, the image encoding apparatus may determine whether to apply ISP to the current block based on various methods as described above, and the result of determination may be encoded in a bitstream as intra prediction technique information. When ISP is available, the image decoding apparatus may determine whether to apply ISP to the current block based on signaled intra prediction technique information.

When ISP does not apply to the current block, TU tiling may be performed with respect to the current block (S1330). Thereafter, encoding/decoding may be performed with respect to the current block or each of the bocks split through the TU tiling step (S1390). Steps S1330 and S1390 are equal to steps S930 and S960 of FIG. 9 and thus a detailed description thereof will be omitted.

In step S1320, when applying ISP to the current block, a split direction and the number of splits (the number of sub-partitions) may be determined (S1340). The description of the determination of the split direction and the number of splits is equal to the description of FIG. 9 and thus will be omitted.

When the split direction and the number of splits are determined in step S1340, the luma component block of the current block may be split based on this (S1350).

Thereafter, it may be determined whether to apply ISP to the chroma component block corresponding to the luma component block (S1360). The determination of step S1360 may be performed by the chroma format and/or by comparison between the width and height of the chroma component block and the maximum transform size.

In the case of the 4:2:0 chroma format, as described below, the width and height of the chroma component block is equal to or less than the maximum transform size. Accordingly, in the case of the 4:2:0 chroma format, without comparing the width and height of the chroma component block with the maximum transform size, it may be determined that ISP does not apply to the chroma component block.

In the case of the 4:2:2 chroma format or the 4:4:4 chroma format, as described below, the width or height of the chroma component block may be greater than the maximum transform size. Accordingly, in the case of the 4:2:2 chroma format or the 4:4:4 chroma format, the width and height of the chroma component block may be compared with the maximum transform size, and, when the width or height of the chroma component block is greater than the maximum transform size, it may be determined that ISP applies to the chroma component block.

As shown in FIG. 14, when the luma component block is a 64×128 block, the chroma component block corresponding thereto is a 32×64 block in the 4:2:0 chroma format, a 32×128 block in the 4:2:2 chroma format or a 64×128 block in the 4:4:4 chroma format.

In the example shown in FIG. 14, it can be seen that both the width (32) and height (64) of the chroma component block of the 4:2:0 chroma format are equal to or less than the maximum transform size (64). Accordingly, in the case of the 4:2:0 chroma format, it may be determined that ISP does not apply to a 32×64 chroma component block without additional size comparison.

In contrast, in the case of the 4:2:2 chroma format or the 4:4:4 chroma format, additionally, the width and height of the chroma component block may be compared with the maximum transform size. In the example shown in FIG. 14, since the width (128) of the 32×128 chroma component block of the 4:2:2 chroma format and the width (128) of the 64×128 chroma component block of the 4:4:4 chroma format is greater than the maximum transform size (64), it may be determined that ISP applies to the chroma component block.

As a modification of Embodiment #1, regardless of the chroma format, based on whether both the width and height of the chroma component block are equal to or less than the maximum transform size, it may be determined whether to apply ISP to the chroma component block. For example, when both the width and height of the chroma component block are equal to or less than the maximum transform size, it may be determined that ISP does not apply to the chroma component block. In addition, when the width or height of the chroma component block is greater than the maximum transform size, it may be determined that ISP applies to the chroma component block.

Upon determining that ISP applies to the chroma component block, the chroma component block may be split (S1370). Split of the chroma component block may be performed based on the split direction and the number of splits determined in step S1340. Specifically, the split direction and the number of splits for the chroma component block may be determined equally to the split direction and the number of splits for the luma component block. According to Embodiment #1 of the present disclosure, in the example shown in FIG. 14, the luma component block is split into four sub-partitions in a horizontal direction. Accordingly, the 32×128 chroma component block of the 4:2:2 chroma format and the 64×128 chroma component block of the 4:4:4 chroma format may be split into four sub-partitions in the horizontal direction equally to the luma component block.

Thereafter, each of the split sub-partitions may be encoded/decoded (S1390). In this case, encoding/decoding of step S1390 may be performed with respect to each sub-partition of the luma component block and each sub-partition of the chroma component block. Step S1390 is equal to step S960 and thus a detailed description thereof will be omitted.

In step S1360, upon determining that ISP does not apply to the chroma component, the chroma component block is not split (S1380), and each sub-partition of the luma component block and the unsplit chroma component block may be encoded/decoded (S1390). Step S1390 is equal to step S960 and thus a detailed description thereof will be omitted. According to Embodiment #1 of the present disclosure, in the example shown in FIG. 14, the 32×64 chroma component block of the 4:2:0 chroma format may not be split.

According to Embodiment #1 of the present disclosure, when the width or height of the chroma component block of the current block to which ISP applies is greater than the maximum transform size, it may be possible to solve that problem that transform or inverse transform of the chroma component block is impossible, by applying ISP to the chroma component block. In addition, according to Embodiment #1 of the present disclosure, when the chroma format of the current block to which ISP applies is 4:2:0 or both the width and height of the chroma component block of the current block to which ISP applies are equal to or less than the maximum transform size, ISP does not apply to the chroma component block. Therefore, since it is possible to avoid the case where ISP unnecessarily applies to the chroma component block, the amount of computation of encoding/decoding may be reduced. In addition, according to Embodiment #1 of the present disclosure, since the split direction and the number of splits of ISP for the chroma component block are determined equally to the split direction of the number of splits of ISP for the luma component block, the split direction and the number of splits of ISP for the chroma component block does not need to be separately signaled or derived.

Embodiment #2

In Embodiment #2 of the present disclosure, in order to solve the conventional problem, when ISP applies to the current block, ISP also applies to the chroma component block. According to Embodiment #2 of the present disclosure, the split direction and the number of splits for the chroma component block may be determined based on the split direction and the number of splits determined for the luma component block.

Figure 15:
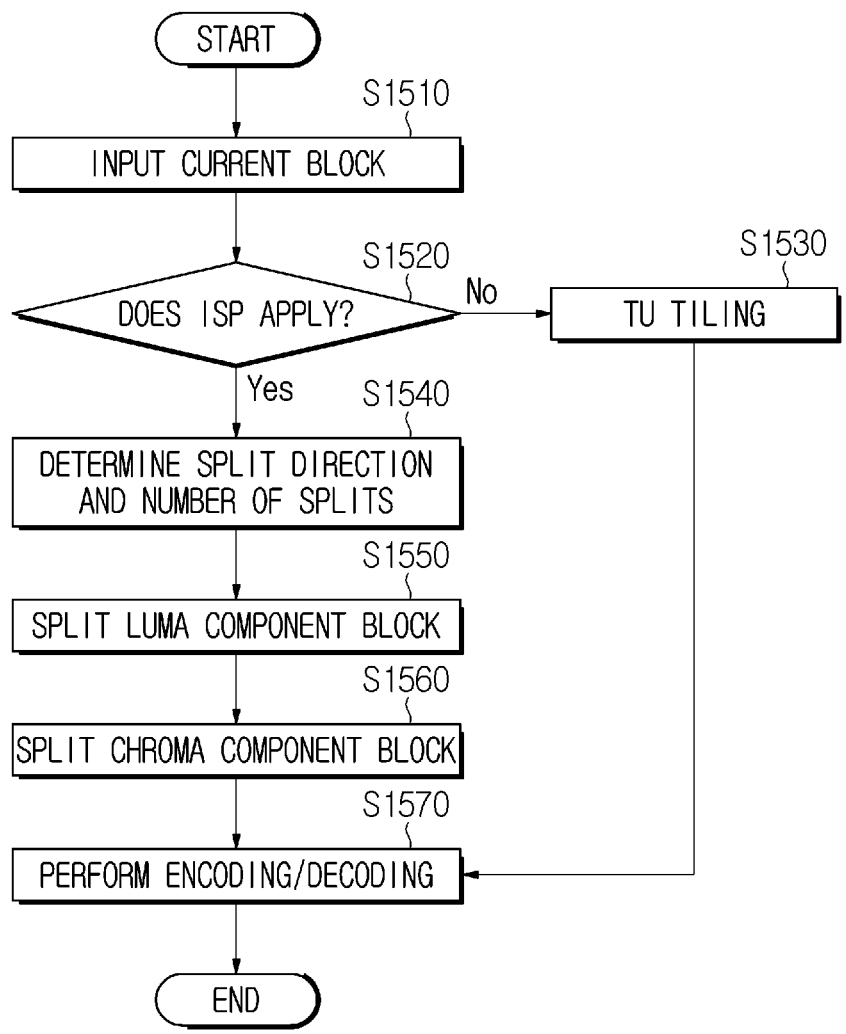
FIG. 15 is a flowchart illustrating an ISP application method according to another embodiment of the present disclosure.

FIG. 15 is a flowchart illustrating an ISP application method according to another embodiment of the present disclosure.

FIG. 16 is a view illustrating an example of splitting a chroma component block according to the ISP application method of FIG. 15.

When a current block to be encoded/decoded is input (S1510), it may be determined whether to apply ISP to the current block (S1520). Determination of step S1520 may include determining whether ISP is available for the current block and/or whether to apply ISP to the current block. The determination as to whether ISP is available for the current block may be performed based on the above-described ISP availability conditions. When ISP is available, the image encoding apparatus may determine whether to apply ISP to the current block based on various methods as described above, and the result of determination may be encoded in a bitstream as intra prediction technique information. When ISP is available, the image decoding apparatus may determine whether to apply ISP to the current block based on signaled intra prediction technique information.

When ISP does not apply to the current block, TU tiling may be performed with respect to the current block (S1530). Thereafter, encoding/decoding may be performed with respect to the current block or each of the bocks split through the TU tiling step (S1570). Steps S1530 and S1570 are equal to steps S930 and S960 of FIG. 9 and a detailed description thereof will be omitted.

In step S1520, when applying ISP to the current block, a split direction and the number of splits (the number of sub-partitions) may be determined (S1540). The description of the determination of the split direction and the number of splits is equal to the description of FIG. 9 and thus will be omitted.

The luma component block of the current block may be split based on the split direction and the number of splits determined in step S1540 (S1550).

Thereafter, the chroma component block of the current block may be split based on the split direction and the number of splits determined in step S1540 (S1560). Specifically, the split direction for the chroma component block may be determined equally to the split direction for the luma component block. In addition, the number of splits for the chroma component block may be determined based on the number of splits for the luma component block. For example, when the number of splits for the luma component block is N, the number of splits for the chroma component block may be determined as N/n. In Embodiment #2 of the present disclosure, for example, n may be 2, but is not limited thereto and n may be any integer. According to Embodiment #2, in the example shown at the top of FIG. 16, a 16×16 luma component block may be split into four sub-partitions in a horizontal direction. In this case, the split direction of the corresponding chroma component block is a horizontal direction, and the number of splits may be determined as 2. That is, the corresponding chroma component block may be split into two sub-partitions in the horizontal direction regardless of the chroma format and/or the size of the chroma component block. In addition, in the example shown at the bottom of FIG. 16, a 4×8 luma component block is split into two sub-partitions in a vertical direction. In this case, the split direction of the corresponding chroma component block is a vertical direction and the number of splits may be determined as 1. In this case, since the chroma component block is not substantially split, it can be seen that ISP does not apply to the chroma component block.

Thereafter, each sub-partition or unsplit chroma component block may be encoded/decoded (S1570). In this case, encoding/decoding of step S1570 may be performed with respect to each sub-partition of the luma component block and each sub-partition of the chroma component block or the chroma component block. Step S1570 is equal to step S960 and thus a detailed description thereof will be omitted.

In Embodiment #2 of the present disclosure, when the size of the maximum coding unit is 128×128, the maximum transform size is 64 which is half the width and height of the maximum coding unit and both the width and height of the current block are greater than the maximum transform size, ISP does not apply to the current block. According to Embodiment #2 of the present disclosure, since the width and height of the chroma component block of the current block to which ISP applies or the sub-partition of the chroma component block are always equal to or less than the maximum transform size, the problem that transform or inverse transform of the chroma component block is impossible may be solved. In addition, according to Embodiment #2 of the present disclosure, since the determination as to whether to apply ISP to the chroma component block of the current block (for example, determination of S1360) does not need to be performed, the amount of computation of encoding/decoding may be reduced. In addition, according to Embodiment #2 of the present disclosure, since the number of sub-partitions for the chroma component block is determined as 2 or 1, it is possible to simplify the encoding/decoding process of the chroma component block. In addition, according to Embodiment #2 of the present disclosure, since the split direction and the number of splits of ISP for the chroma component block are determined equally to the split direction and (the number of splits/2) of ISP for the luma component block, the split direction and the number of splits of ISP for the chroma component block does not need to be separately signaled or derived.

Embodiment #3

In Embodiment #3 of the present disclosure, in order to solve the conventional problem, the width and height of the chroma component block are equal to or less than the maximum transform size by changing the ISP availability conditions.

According to the conventional ISP method described with reference to FIG. 9, when both the width and height of the current block are greater than the maximum transform size, it is determined that ISP does not apply to the current block. That is, when one of the width or height of the current block is greater than the maximum transform size and the other is equal to or less than the maximum transform size, it is determined that ISP applies to the current block.

In Embodiment #3 of the present disclosure, the above-described ISP availability conditions are modified as following table 5.

TABLE 5

<Modified ISP availability conditions>
- intra_luma_ref_idx[ x0 ][ y0 ] = = 0
- cbWidth <= MaxTbSizeY && cbHeight <= MaxTbSizeY
- cbWidth * cbHeight > MinTbSizeY * MinTbSizeY Among the modified ISP availability conditions, a condition in which intra_luma_ref_idx[x0][y0] is 0 and a condition in which cbWidth*cbHeight is greater than MinTbSizeY*MinTbSizeY are equal to the existing ISP availability conditions. According to the modified ISP availability conditions, only when both cbWidth and cbHeight of the current block are equal to or less than MaxTbSizeY, it may be determined that ISP is available for the current block.

According to Embodiment #3 of the present disclosure to which the modified ISP availability conditions apply, only when both the width and height of the current block are equal to or less than the maximum transform size, it is determined that ISP applies to the current block, and intra_subpartitions_mode_flag indicating whether to apply ISP may be transmitted.

According to Embodiment #3 of the present disclosure, since both the width and height of the current block are equal to or less than the maximum transform size, the width and/or height of the chroma sample block corresponding to the luma sample block of the current block are always equal to or less than the maximum transform size regardless of the chroma format. Accordingly, it is possible to solve the problem of the conventional ISP method described with reference to FIG. 9, by applying the modified ISP availability conditions.

A method according to Embodiment #3 of the present disclosure may be implemented by modifying the ISP availability conditions of the conventional method. Accordingly, the method according to Embodiment #3 of the present disclosure may be performed equally to the flowchart shown in FIG. 9 except that only the condition for determining whether ISP is available in step S920 is different.

FIG. 17 is a view illustrating an example of the structure of a bitstream in which a modified ISP availability condition is reflected.

The rectangular box of FIG. 17 is related to signaling of information on ISP of intra prediction technique information of a current coding unit. As shown in FIG. 17, when the above-described modified ISP availability conditions are satisfied, intra_subpartitions_mode_flag regarding whether to apply ISP may be transmitted. intra_subpartitions_mode_flag is information indicating whether to apply ISP to the current coding unit. When the ISP availability conditions are not satisfied, intra_subpartitions_mode_flag is not transmitted, and it may be determined that ISP does not apply to the current coding unit.

The modified ISP availability conditions may include one or more conditions, and one or more conditions included in the modified ISP availability conditions are not limited to the above examples. That is, some conditions may be omitted or other conditions may be additionally included within the scope of the technical idea according to the present disclosure.

In addition, as shown in FIG. 17, when ISP applies to the current block, that is, when intra_subpartitions_mode_flag is 1, information (intra_subpartitions_split_flag) indicating the split direction may be transmitted.

In the example shown in FIG. 17, only when the condition of cbWidth<=MaxTbSizeY && cbHeight<=MaxTbSizeY is satisfied, intra_subpartitions_mode_flag may be transmitted. That is, when the transmitted intra_subpartitions_mode_flag is 1, it can be seen that the condition of cbWidth<=MaxTbSizeY && cbHeight<=MaxTbSizeY I is already satisfied. Accordingly, the condition of FIG. 17 related to whether to transmit intra_sinpartitions_split_flag may be changed as shown in FIG. 18.

FIG. 18 is a view illustrating another example of the structure of a bitstream in which a modified ISP availability condition is reflected.

The rectangular box of FIG. 18 is related to signaling of information on ISP of intra prediction technique information of the current coding unit. As shown in FIG. 18, intra_subpartitions_mode_flag may be signaled when the above-described modified ISP availability conditions are satisfied, and intra_sinpartitions_split_flag may be signaled when a condition in which intra_subpartitions_mode_flag is 1 is satisfied.

According to Embodiment #3 of the present disclosure, both the width and height of the current block to which ISP applies are equal to or less than the maximum transform size. Accordingly, since both the width and height of the chroma component block of the current block are equal to or less than the maximum transform size regardless of the chroma format, the problem that transform or inverse transform of the chroma component block is impossible may be solved. In addition, according to Embodiment #3 of the present disclosure, since the determination as to whether to apply ISP to the chroma component block of the current block (for example, determination of S1360) and ISP for the chroma component block do not need to be performed, the amount of computation of encoding/decoding may be reduced. In addition, according to Embodiment #3 of the present disclosure, since the conventional encoding/decoding process is not significantly changed, the conventional problem can be solved without significantly encoding/decoding complexity.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 19:
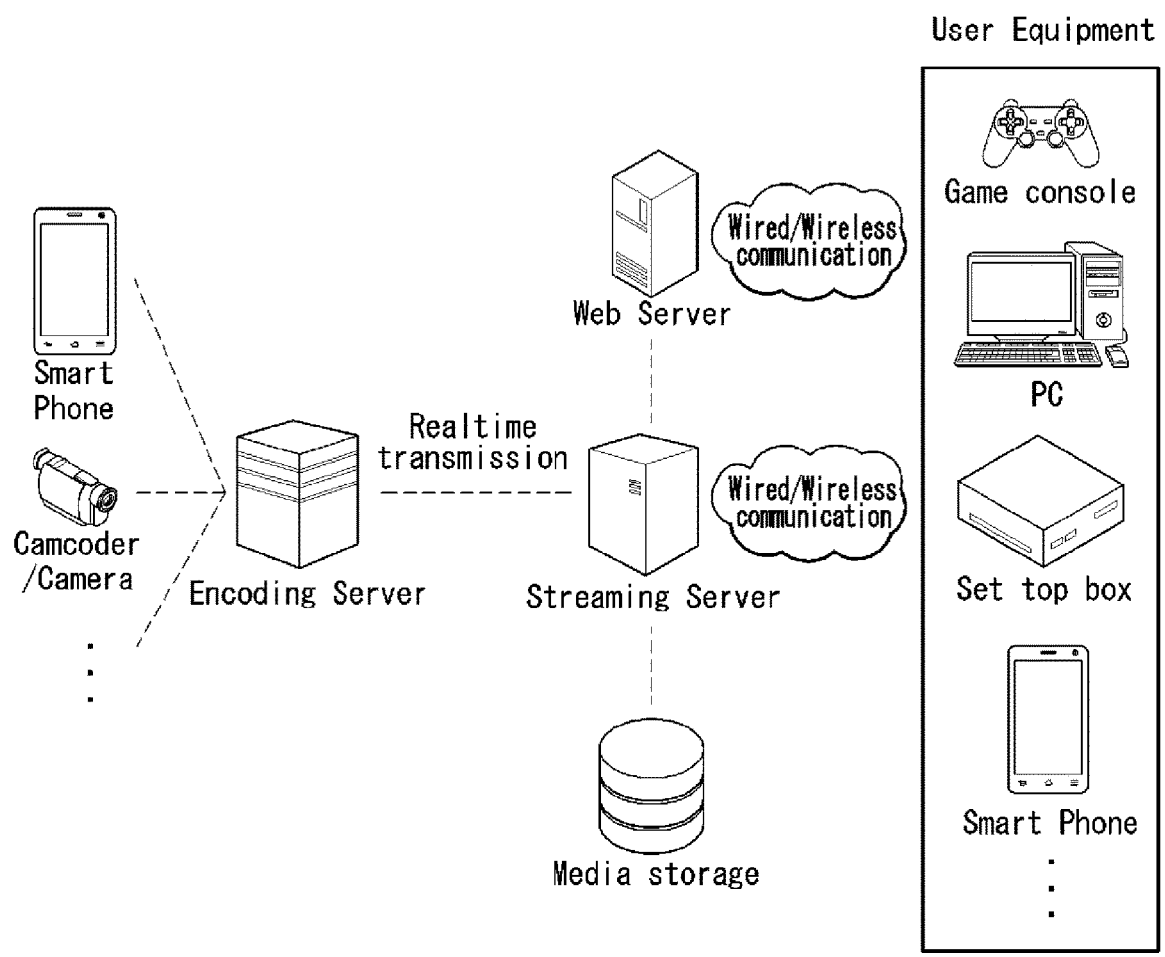
FIG. 19 is a view showing a content streaming system, to which an embodiment of the present disclosure is applicable.

FIG. 19 is a view showing a content streaming system, to which an embodiment of the present disclosure is applicable.

As shown in FIG. 19, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:
    determining a prediction mode of a current block based on prediction mode information of the current block;
    determining whether intra sub-partitions (ISP) is available for the current block based on the prediction mode of the current block being an intra prediction mode;
    decoding ISP mode information for the current block, based on the ISP being available for the current block; and
    generating a prediction sample for the current block based on the ISP mode information,
    wherein the ISP mode information includes whether the current block is partitioned into sub-partitions.

2. The image decoding method of claim 1, wherein the determining whether the ISP is available for the current block is performed based on comparison between a size of a luma component block of the current block and a predetermined threshold.

3. The image decoding method of claim 2, wherein the predetermined threshold is a maximum transform size.

4. The image decoding method of claim 2, wherein, when both a width and height of the luma component block of the current block are equal to or less than a predetermined threshold, it is determined that the ISP is available for the current block.

5. The image decoding method of claim 1, wherein the generating the prediction sample for the current block based on the ISP mode information comprises:
    generating a prediction sample for a luma component block by applying the ISP to the luma component block of the current block;
    determining whether to apply the ISP to a chroma component block of the current block; and
    generating a prediction sample for the chroma component block by applying the ISP to the chroma component block, upon determining that the ISP applies to the chroma component block of the current block.

6. The image decoding method of claim 5, wherein the determining whether to apply the ISP to the chroma component block of the current block is performed based on at least one of a size of the chroma component block or a chroma format of the current block.

7. The image decoding method of claim 6, wherein, when the chroma format of the current block is 4:2:2 or 4:4:4 and at least one of a width or height of the chroma component block is greater than a maximum transform size, it is determined that the ISP applies to the chroma component block of the current block.

8. The image decoding method of claim 5, wherein, when the ISP applies to the chroma component block, a split direction and a number of sub-partitions for the chroma component block are determined based on a split direction and a number of sub-partitions for the luma component block.

9. The image decoding method of claim 8, wherein the split direction and the number of sub-partitions for the chroma component block are equal to the split direction and the number of sub-partitions for the luma component block, respectively.

10. The image decoding method of claim 1, wherein the generating the prediction sample for the current block based on the ISP mode information comprises:
generating a prediction sample for a luma component block by applying the ISP to the luma component block of the current block; and
generating a prediction sample for a chroma component block by applying the ISP to the chroma component block of the current block.

11. The image decoding method of claim 10, wherein a split direction and a number of sub-partitions for the chroma component block are determined based on a split direction and a number of sub-partitions for the luma component block.

12. The image decoding method of claim 11, wherein the split direction and the number of sub-partitions for the chroma component block are equal to the split direction and (the number of sub-partitions/2) of the luma component block, respectively.

13. An image decoding apparatus comprising:
a memory; and
at least one processor,
wherein the at least one processor is configured to:
determine a prediction mode of a current block based on prediction mode information of the current block;
determine whether intra sub-partitions (ISP) is available for the current block based on the prediction mode of the current block being an intra prediction mode;
decode ISP mode information for the current block, based on the ISP being available for the current block; and
generate a prediction sample for the current block based on the ISP mode information,
wherein the ISP mode information includes whether the current block is partitioned into sub-partitions.

14. An image encoding method performed by an image encoding apparatus, the image encoding method comprising:
determining a prediction mode of a current block;
determining whether intra sub-partitions (ISP) is available for the current block based on the prediction mode of the current block being an intra prediction mode;
determining whether to apply the ISP to the current block, based on the ISP being available for the current block;
generating a prediction sample for the current block by applying the ISP to the current block, based on the ISP being determined to be applied to the current block; and
encoding prediction mode information of the current block and ISP mode information,
wherein the ISP mode information includes whether the current block is partitioned into sub-partitions.

15. A method of transmitting a bitstream generated by the image encoding method of claim 14, comprising:
transmitting the bitstream including the encoded prediction mode information and the encoded ISP mode information.

* * * * *